(12) United States Patent
Zhou et al.

(10) Patent No.: US 11,275,239 B2
(45) Date of Patent: Mar. 15, 2022

(54) METHOD AND APPARATUS FOR OPERATING CONTROL SYSTEM, STORAGE MEDIUM, AND ELECTRONIC APPARATUS

(71) Applicant: TENCENT TECHNOLOGY (SHENZHEN) COMPANY LIMITED, Shenzhen (CN)

(72) Inventors: Yang Zhou, Shenzhen (CN); Jingui Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 284 days.

(21) Appl. No.: 16/594,565

(22) Filed: Oct. 7, 2019

(65) Prior Publication Data

US 2020/0033599 A1  Jan. 30, 2020

Related U.S. Application Data

(63) Continuation of application No. PCT/CN2018/112047, filed on Oct. 26, 2018.

(30) Foreign Application Priority Data

Nov. 3, 2017 (CN) .......................... 201711070963.9

(51) Int. Cl.
*G02B 27/01* (2006.01)
*G06T 7/73* (2017.01)
(Continued)

(52) U.S. Cl.
CPC ......... *G02B 27/0101* (2013.01); *G06F 3/013* (2013.01); *G06F 16/5866* (2019.01);
(Continued)

(58) Field of Classification Search
None
See application file for complete search history.

(56) References Cited

U.S. PATENT DOCUMENTS

2013/0071013 A1* 3/2013 Ogata .................... G06T 7/593
382/154
2013/0083173 A1* 4/2013 Geisner ................. G09G 3/003
348/51
(Continued)

FOREIGN PATENT DOCUMENTS

CN   103487938 A   1/2014
CN   103617608 A   3/2014
(Continued)

OTHER PUBLICATIONS

The World Intellectual Property Organization (WIPO) International Search Report for PCT/CN2018/112047 dated Jan. 15, 2019 6 Pages (including translation).
(Continued)

*Primary Examiner* — Ryan M Gray
(74) *Attorney, Agent, or Firm* — Anova Law Group, PLLC

(57) ABSTRACT

Embodiments of the present disclosure disclose a method and an apparatus for operating a control system, a storage medium, and an electronic apparatus. The method includes: obtaining, by using a target recording device in a control system, first image information of a target object moving in a real scene; obtaining a first distance corresponding to the first image information, the first distance being a distance between the target recording device and the target object; and adjusting a target parameter of the control system according to the first distance, the target parameter being used for outputting media information to a virtual reality (VR) device, the VR device being connected to the control system, the media information being corresponding to
(Continued)

movement information of the target object moving in the real scene, and the movement information comprising the first distance.

19 Claims, 6 Drawing Sheets

(51) Int. Cl.
    *H04N 13/128*     (2018.01)
    *H04N 13/117*     (2018.01)
    *H04N 13/239*     (2018.01)
    *G06F 16/58*     (2019.01)
    *G06F 3/01*     (2006.01)
    *G06K 9/00*     (2006.01)
    *G06T 19/00*     (2011.01)

(52) U.S. Cl.
    CPC ............ *G06K 9/00671* (2013.01); *G06T 7/74* (2017.01); *G06T 19/006* (2013.01); *H04N 13/117* (2018.05); *H04N 13/128* (2018.05); *H04N 13/239* (2018.05); *G02B 2027/0136* (2013.01)

(56) References Cited

U.S. PATENT DOCUMENTS

| | | | | |
|---|---|---|---|---|
| 2013/0088573 | A1* | 4/2013 | Collar | H04N 13/189 348/46 |
| 2013/0342536 | A1* | 12/2013 | Taya | G06F 3/013 345/427 |
| 2015/0049079 | A1* | 2/2015 | Ding | G06T 15/00 345/419 |
| 2015/0215192 | A1 | 7/2015 | Shuster | |
| 2015/0234206 | A1 | 8/2015 | Lee et al. | |
| 2016/0357268 | A1 | 12/2016 | Alameh et al. | |
| 2017/0243406 | A1 | 8/2017 | Yamazaki | |
| 2018/0295352 | A1* | 10/2018 | Ninan | G06F 3/0346 |
| 2019/0068993 | A1* | 2/2019 | Aflaki Beni | H04N 19/124 |

FOREIGN PATENT DOCUMENTS

| | | |
|---|---|---|
| CN | 104898276 A | 9/2015 |
| CN | 105630336 A | 6/2016 |
| CN | 105847578 A | 8/2016 |
| CN | 105959595 A | 9/2016 |
| CN | 106095235 A | 11/2016 |
| CN | 106157930 A | 11/2016 |
| CN | 106225764 A | 12/2016 |
| CN | 106303565 A | 1/2017 |
| CN | 106462178 A | 2/2017 |
| CN | 106534707 A | 3/2017 |
| CN | 106572417 A | 4/2017 |
| CN | 106598229 A | 4/2017 |
| CN | 106713890 A | 5/2017 |
| CN | 106796771 A | 5/2017 |
| CN | 106843532 A | 6/2017 |
| CN | 107105183 A | 8/2017 |
| JP | 6207691 B1 | 10/2017 |

OTHER PUBLICATIONS

The State Intellectual Property Office of the People's Republic of China (SIPO) Office Action 1 for for 201711070963.9 dated Apr. 6, 2021 13 Pages (including translation).

* cited by examiner

METHOD AND APPARATUS FOR OPERATING CONTROL SYSTEM, STORAGE MEDIUM, AND ELECTRONIC APPARATUS

RELATED APPLICATION

This application claims priority to PCT Application No. PCT/CN/2018112047, filed on Oct. 26, 2018, which in turn claims priority to Chinese Patent Application No. 201711070963.9, entitled "METHOD AND APPARATUS FOR PROCESSING CONTROL SYSTEM, STORAGE MEDIUM, AND ELECTRONIC APPARATUS," filed with the China National Intellectual Property Administration on Nov. 3, 2017, which are both incorporated by reference in their entirety.

FIELD OF THE TECHNOLOGY

Embodiments of the present disclosure relate to the virtual reality field, and specifically, to a method and an apparatus for operating a control system, a storage medium, and an electronic apparatus.

BACKGROUND OF THE DISCLOSURE

At present, during a performance, an actor often moves around on stage to perform, and staff usually needs to manually adjust parameters of a control system to ensure the performance effect of the actor. For example, the staff needs to manually adjust parameters of a spotlight device of the control system to dynamically adjust the position of the light, to ensure good facial light on the actor. As a result, relatively high labor costs are needed.

In addition, in the related technology, on the basis of a binocular camera of a binocular video camera, an additional depth camera is configured to obtain depth information, so that when an actor performs live online by using the binocular video camera, a user may watch the performance by using virtual reality (VR) glasses to experience face-to-face live feelings with the actor. However, this system needs an additional camera, which increases hardware costs of the control system.

In the related technology, a complicated algorithm is also used to process an image obtained by the binocular camera, and to calculate depth information of each pixel point in the image. Although precise depth information may be obtained by using the method, operational costs are high, and real-time performance cannot be achieved.

SUMMARY

Embodiments of the present disclosure provide a method and an apparatus for operating a control system, a storage medium, and an electronic apparatus, so as to resolve at least the technical problem of large control costs of the control system in the related technology.

According to an aspect of the embodiments of the present disclosure, a method for operating a control system is provided. The method includes: obtaining, by using a target recording device in a control system, first image information of a target object moving in a real scene; obtaining a first distance corresponding to the first image information, the first distance being a distance between the target recording device and the target object; and adjusting a target parameter of the control system according to the first distance, the target parameter being used for outputting media information to a virtual reality (VR) device, the VR device being connected to the control system, the media information being corresponding to movement information of the target object moving in the real scene, and the movement information comprising the first distance.

According to another aspect of the embodiments of the present disclosure, an apparatus for operating a control system is further provided, including one or more processors and one or more memories storing program units. The program units are executed by the processor, and the program units include: a first obtaining unit, configured to obtain, by using a target recording device in a control system, first image information of a target object moving in a real scene; a second obtaining unit, configured to obtain a first distance corresponding to the first image information, the first distance being a distance between the target recording device and the target object; and an adjustment unit, configured to adjust a target parameter of the control system according to the first distance, the target parameter being used to control media information being sent to a virtual reality (VR) device, the VR device being connected to the control system, and the media information being corresponding to movement information of the target object moving in the real scene, and the movement information comprising the first distance.

According to another aspect of the embodiments of the present disclosure, a storage medium is further provided. The storage medium stores a computer program, and the computer program is configured to perform, the method according to the embodiments of the present disclosure. The method includes: obtaining, by using a target recording device in a control system, first image information of a target object moving in a real scene; obtaining a first distance corresponding to the first image information, the first distance being a distance between the target recording device and the target object; and adjusting a target parameter of the control system according to the first distance, the target parameter being used for outputting media information to a virtual reality (VR) device, the VR device being connected to the control system, the media information being corresponding to movement information of the target object moving in the real scene, and the movement information comprising the first distance.

In the embodiments of the present disclosure, first image information of a target object currently moving in a real scene is obtained by using a target recording device in a control system; a first distance corresponding to the first image information is obtained, the first distance being a distance between the target recording device and the target object; and a target parameter of the control system is adjusted according to the first distance, the target parameter being used for controlling the control system to output media information to a VR device, the VR device being connected to the control system, the media information being corresponding to movement information of the target object moving in the real scene, and the movement information including the first distance. According to the correspondence between the image information and the distance, the first distance between the target recording device and the target object may be obtained at low cost by using the first image information of the target object, and the target parameter of the control system may further be adjusted according to the first distance, to control, by using the target parameter, the control system to output the media information corresponding to the movement information of the target object to the VR device, thereby avoiding manually adjusting the target parameter of the control system, achieving the objective of controlling, by using the target parameter of the control system, the control system to output the media information to the VR device, achieving the technical effect of reducing control costs of the control system, and further resolving the technical problem of large control costs of the control system in the related technology.

BRIEF DESCRIPTION OF THE DRAWINGS

Accompanying drawings described herein are used to provide further understanding about the embodiments of the present disclosure, and constitute one portion of the present disclosure; and schematic embodiments of the present disclosure and their description are used to explain the present disclosure, and do not constitute an inappropriate limit on the present disclosure. In the figures.

DESCRIPTION OF EMBODIMENTS

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The specification and claims of the present disclosure, and terms "first" and "second" in the foregoing accompanying drawings are used to distinguish similar objects, but are unnecessarily used to describe a specific sequence or order. It should be understood that, data used in this way is exchangeable in a proper case, so that the embodiments of the present disclosure that are described herein can be implemented in another order except those shown or described herein. In addition, the terms "include", "comprise", and any variants thereof are intended to cover a non-exclusive inclusion. For example, a process, method, system, product, or device that includes a series of steps or elements is not limited to the steps or units that are clearly listed, but may include other steps or units that are not clearly listed or that are inherent to the process, method, product, or device.

According to an aspect of the embodiments of the present disclosure, an embodiment of a method for operating a control system is provided.

Figure 1:
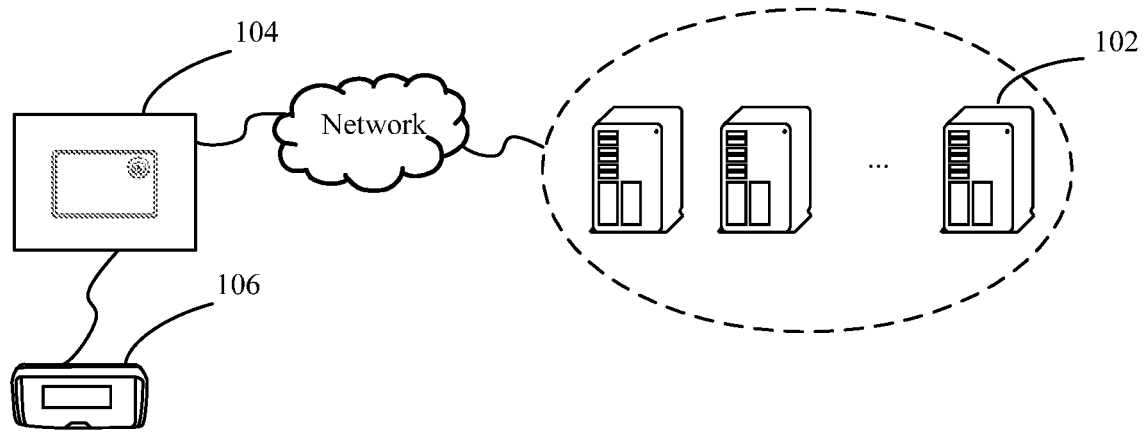
FIG. 1 is a schematic diagram of a hardware environment of a method for operating a control system according to an embodiment of the present disclosure.

In this embodiment, the method for operating a control system may be applied to a hardware environment including a server 102, a control system 104 including a target recording device, and a VR device 106 shown in FIG. 1. FIG. 1 is a schematic diagram of a hardware environment of a method for operating a control system according to an embodiment of the present disclosure. As shown in FIG. 1, the server 102 is connected to the control system 104 through a network. The network includes but is not limited to a wide area network, a metropolitan area network, or a local area network, and the control system 104 is not limited to a stage control system or the like. The method for operating a control system in this embodiment of the present disclosure may be performed by the server 102, or may be performed by the control system 104, or may be performed jointly by the server 102 and the control system 104. When the control system 104 performs the method for operating a control system in this embodiment of the present disclosure, the method for operating a control system may alternatively be performed by a client installed in the control system 104. The VR device 106 is not limited to: a VR helmet, VR glasses, a VR all-in-one machine, or the like, and is configured for users to experience media information outputted by the control system to the VR device. The media information is not limited to sound information, light information, or the like.

Figure 2:
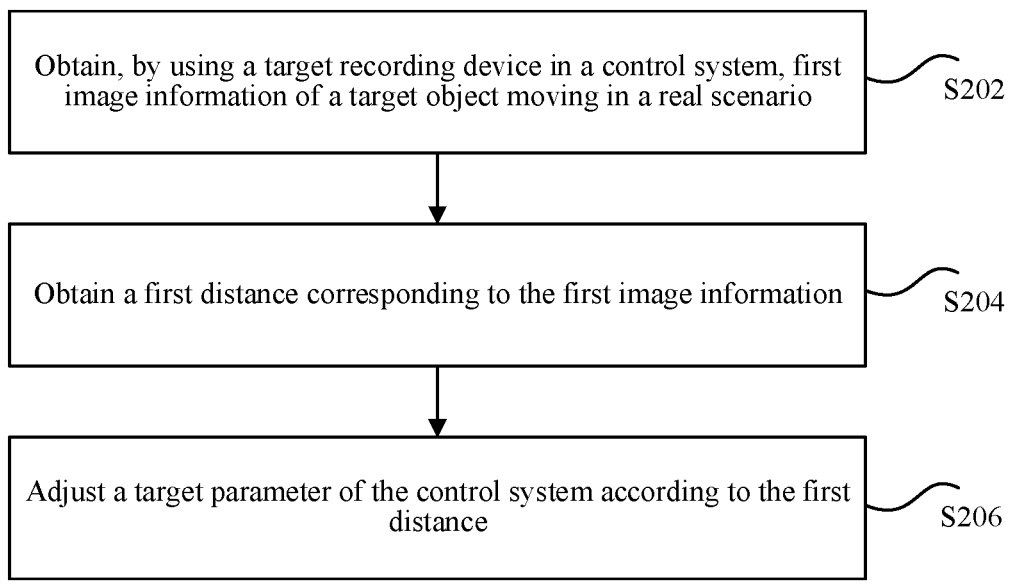
FIG. 2 is a flowchart of a method for operating a control system according to an embodiment of the present disclosure.

FIG. 2 is a flowchart of a method for operating a control system according to an embodiment of the present disclosure. As shown in FIG. 2, the method may include the following steps.

Step S202. Obtain, by using a target recording device in a control system, first image information of a target object currently moving in a real scene.

In the technical solution provided in the foregoing step S202 in this application, the control system may be a performance stage control system, configured to control performance effects of actors on a stage, or control performance effects of actors in a live studio, including a sound effect, a light effect, and other control effects. The control system includes a target recording device. The target recording device may have two cameras, that is, the target recording device is a binocular recording device, for example, a binocular video camera including a left camera and a right camera, or a binocular camera. Compared with a monocular recording device, the binocular recording device in this embodiment uses the principles of bionics, obtains synchronously exposed images by using a calibrated binocular camera, and then calculates three-dimensional (3D) depth information of pixel points of obtained two-dimensional image. In some embodiments, the real scene in this embodiment includes a performance scenario of actors on a stage.

In this embodiment, the first image information of the target object currently moving in the real scene is obtained by using the target recording device. The target object in this embodiment may be an object such as an actor, an anchor, or an item in the real scene. The target object moves in the real scene, that is, a distance between the target object and the target recording device changes. The first image information of the target object may be acquired in real time by using the target recording device. The first image information may be screen information of the target object acquired in real time, and includes picture information and video information obtained by using the binocular recording device, and may further include a difference between a midpoint horizontal coordinate of an image obtained by using a left camera in the target recording device and a midpoint horizontal coordinate of an image obtained by using a right camera. That is, the first image information further includes an image parallax, which is not limited herein.

Step S204. Obtain a first distance corresponding to the first image information.

In the technical solution provided in the foregoing step S204 in this application, the first distance is the distance between the target recording device and the target object.

After the first image information of the current target object is obtained by using the target recording device of the control system, the first distance corresponding to the first image information is obtained. The first distance is a real-time distance between the target object and the target recording device, and may be depth information of the target recording device for the target object.

In this embodiment, the first distance corresponding to the first image information is obtained from a correspondence table. The correspondence table includes a pre-established data relationship between the image parallax and a distance between the target object and a target camera. A first distance corresponding to a current time may be looked up from the correspondence table according to the image parallax in the first image information.

Step S206. Adjust a target parameter of the control system according to the first distance.

In the technical solution provided in the foregoing step S206 in this application, after the first distance corresponding to the first image information is obtained, the target parameter of the control system is adjusted according to the first distance. The target parameter is used for controlling the control system to output media information to a VR device, the VR device is connected to the control system, the media information is corresponding to movement information of the target object moving in the real scene, and the movement information includes the first distance.

The target parameter of the control system in this embodiment may be a control parameter needed to achieve some performance effects during stage control, and is used for controlling the control system to output the media information to the VR device. The target parameter may include a sound parameter, a light parameter or the like of the control system. The sound parameter is used for controlling the control system to output sound information to the VR device, and the light parameter is used for controlling the control system to output light information to the VR device. The VR device in this embodiment is connected to the control system. The VR device may map the image information and the media information obtained by the control system, may be a VR glasses box, and may be used by a user to watch a performance, to experience the control effect of the control system.

In some embodiments, in the moving process of the target object in the real scene, the target parameter of the control system is adjusted according to a status change of the distance between the target object and the target recording device. In some embodiments, the sound parameter of the control system is adjusted. For example, the sound intensity (unit: dB) of the control system is adjusted. In some embodiments, the sound intensity is inversely proportional to the square of the distance. When the target object is close to the target recording device in the moving process in the real scene, the sound parameter of the control system is adjusted to raise the sound; and when the target object is far from the target recording device in the moving process in the real scene, the sound parameter of the control system is adjusted to lower the sound, so that the user can hear more real sound when watching the performance, thereby bringing immersive experience to the user.

This embodiment does not limit the adjustment rule for adjusting the sound parameter by the control system. Any adjustment rule that can implement louder sound when the target object is close to the target recording device and quieter sound when the target object is far from the target recording device falls within the scope of this embodiment of the present disclosure.

In this embodiment, the light parameter of the control system may further be adjusted to control the light. For example, when the distance between the target object and the target recording device is reduced, the light control PTZ automatically moves the light focus to a region closer to the target recording device; when the distance between the target object and the target recording device increased, the light control PTZ automatically moves the light focus to a region farther from the target recording device, so that the spotlight can be controlled to move as the target object moves around, to ensure that good light shines on actors, thereby bringing immersive experience to the user.

This embodiment does not specifically limit the adjustment rule for adjusting the light parameter. Any adjustment rule that can implement that the light PTZ automatically moves the light focus to a region close to the target recording device when the target object is closer to the target recording device, and the light control PTZ automatically moves the light focus to a region farther from the target recording device when the distance between the target object and the target recording device increased falls within the scope of this embodiment of the present disclosure, which is not described herein by using examples.

The media information in this embodiment is corresponding to the movement information of the target object moving in the real scene. The media information includes sound information, light information, and information needed when the user watches the stage performance. The sound information includes sound information of loudness. For example, when the target object is close to the target recording device, the sound information is raised sound; and when the target object is far from the target recording device, the sound information is lowered sound. In this way, when the user performs experiencing by using the VR device, for example, performs watching by using the VR glasses box, when the target object is closer to the user, the user experiences that the heard sound is raised, and when the target object is farther from the user, the user experiences that the heard sound is lowered, so that the user can hear more real sound when watching the performance, thereby bringing immersive experience to the user.

In some embodiments, when the target object is close to the target recording device, the media information is light information presented when the light PTZ automatically moves the light focus to the region close to the target recording device; and when the target object is close to the target recording device, the media information is light information presented when the light PTZ automatically moves the light focus to the region far from the target recording device, thereby ensuring that good light shines on actors, thereby bringing immersive experience to the user.

In addition to the foregoing media information, this embodiment may further include other information used for stage control, which is not limited herein.

Through the foregoing step S202 to step S206, first image information of a target object currently moving in a real scene is obtained by using a target recording device in a control system; a first distance corresponding to the first image information is obtained, the first distance being a distance between the target recording device and the target object; and a target parameter of the control system is adjusted according to the first distance, the target parameter being used for controlling the control system to output media information to a VR device, the VR device being connected to the control system, the media information being corresponding to movement information of the target object moving in the real scene, and the movement information including the first distance. According to the correspondence between the image information and the distance, the first distance between the target recording device and the target object may be obtained at low cost by using the first image information of the target object, and the target parameter of the control system may be adjusted according to the first distance, to control, by using the target parameter, the control system to output the media information corresponding to the movement information of the target object to the VR device, thereby avoiding manually adjusting the target parameter of the control system, achieving the objective of controlling, by using the target parameter of the control system, the control system to output the media information to the VR device, achieving the technical effect of reducing control costs of the control system, and further resolving the technical problem of large control costs of the control system in the related technology.

In one embodiment, the obtaining a first distance corresponding to the first image information in step S204 includes: obtaining a first image parallax between first sub-image information and second sub-image information in the first image information, where the first sub-image information is obtained by recording the target object by a first video camera, the second sub-image information is obtained by recording the target object by a second video camera, the first video camera and the second video camera are deployed in the target recording device, and the first image parallax is used for representing a difference between a first image of the target object indicated by the first sub-image information and a second image of the target object indicated by the second sub-image information; and obtaining the first distance corresponding to the first image parallax in a target correspondence table.

In this embodiment, the image information obtained by using the target recording device includes an image parallax, that is, the first image information includes a first image parallax. The first image parallax is used for representing a difference between a first image of the target object indicated by the first sub-image information and a second image of the target object indicated by the second sub-image information, and is obtained according to the first sub-image information and the second sub-image information. For example, the first image parallax is obtained by using a difference between a midpoint horizontal coordinate of a first sub-image and a midpoint horizontal coordinate of a second sub-image. The first sub-image information is obtained by recording the target object by a first video camera in the target recording device, and the first video camera may be a left camera, or a right camera of the binocular video camera. The second sub-image information is obtained by recording the target object by a second video camera in the target recording device. If the first video camera is the left camera of the binocular video camera, the second video camera may be the right camera of the binocular video camera, and if the first video camera is the right camera of the binocular video camera, the second video camera may be the left camera of the binocular video camera.

The target correspondence table in this embodiment is a pre-established data relationship table of relationships between image parallaxes and distances, including a correspondence between an image parallax and a distance. The image parallax is used for representing a difference between different images obtained by using the target recording device, including the first image parallax in this embodiment. The distance is the distance between the target recording device and the target object, including the first distance in this embodiment. If the image parallax is determined, the distance may be determined according to the image parallax and the correspondence between the image parallax and the distance by using the target correspondence table, thereby achieving the objective of rapidly obtaining the distance corresponding to the image parallax at low costs. For example, the target correspondence table stores a correspondence between the first image parallax and the first distance. After the first image parallax between the first sub-image information and the second sub-image information is obtained, the first distance corresponding to the first image parallax is obtained from the target correspondence table, thereby rapidly obtaining the first distance corresponding to the first image parallax at low costs in the target correspondence table, and the target parameter of the control system is further adjusted according to the first distance, and the media information corresponding to the target parameter is output, thereby achieving the technical effect of reducing control costs of the control system, and improving user experience.

In some embodiments, in addition to the correspondence between the first image parallax and the first distance, the target correspondence table may further pre-store more other correspondences between the image parallaxes and the distances. If the distance between the target recording device and the target object is determined, an image parallax corresponding to the distance may be obtained, to store the image parallax corresponding to the distance to the target correspondence table. For example, if the distance between the target recording device and the target object is set to D1 meters, image information of the target object in a distance of D1 meters from the target recording device is obtained by using the target recording device, the image parallax is obtained from the image information, and then the foregoing D1 meters and the image parallax corresponding to the D1 meters is stored to the target correspondence table; then the distance between the target recording device and the target object is set to D2 meters, the D2 meters and the D1 meters are different, image information of the target object in a distance of D2 meters from the target recording device is obtained by using the target recording device, the image parallax is obtained from the image information, and the foregoing D2 meters and the image parallax corresponding to the D2 meters are stored to the target correspondence table, to establish the target correspondence table, thereby storing more distances and corresponding image parallaxes to the target correspondence table by using the foregoing method.

In one embodiment, the obtaining a first image parallax between first sub-image information and second sub-image information in the first image information includes: obtaining a first midpoint horizontal coordinate in the first sub-image information, where the first midpoint horizontal coordinate is a horizontal coordinate of a central point of the first image in a target coordinate system; obtaining a second midpoint horizontal coordinate in the second sub-image information, where the second midpoint horizontal coordinate is a horizontal coordinate of a central point of the second image in the target coordinate system; and determining a difference between the first midpoint horizontal coordinate and the second midpoint horizontal coordinate as the first image parallax.

In this embodiment, the image information includes a midpoint horizontal coordinate, and the midpoint horizontal coordinate is a horizontal coordinate value of a central point of the image in the target coordinate system. The first midpoint horizontal coordinate in the first sub-image information is obtained. For example, the first sub-image information is screen information acquired by the left camera, and the screen information may be a left portrait. If a central point of the left portrait in the target coordinate system is (X1, Y1), a first midpoint horizontal coordinate of the left portrait is X1. The second midpoint horizontal coordinate in the second sub-image information is obtained, the second sub-image information may be screen information acquired by the right camera, and the screen information may be a right portrait. If a central point of the right portrait in the target coordinate system is (X2, Y2), a second midpoint horizontal coordinate of the right portrait is X2. After the first midpoint horizontal coordinate in the first sub-image information, and the second midpoint horizontal coordinate in the second sub-image information are obtained, the difference between the first midpoint horizontal coordinate and the second midpoint horizontal coordinate is obtained, and the difference between the first midpoint horizontal coordinate and the second midpoint horizontal coordinate is determined as the first image parallax. That is, (X1-X2) may be determined as the first image parallax, the first distance corresponding to the first image parallax is further obtained, the target parameter of the control system is adjusted according to the first distance, and the media information corresponding to the target parameter is output, thereby achieving the technical effect of reducing control costs of the control system, and improving user experience.

In one embodiment, the obtaining the first distance corresponding to the first image parallax in a target correspondence table includes: looking up the target correspondence table for a target image parallax with a minimum difference from the first image parallax; and determining a distance corresponding to the target image parallax in the target correspondence table as the first distance.

In this embodiment, when the first distance corresponding to the first image parallax is obtained, the target correspondence table is a pre-established data relationship between the image parallax and the distance, but during real-time calculation of the image parallax, the image parallax obtained through calculation may be not in the pre-established correspondence table. In the foregoing case, a target image parallax with a minimum difference from the first image parallax may be looked up in the target correspondence table, and the difference is an absolute difference. That is, an image parallax closest to the first image parallax is looked up in the target correspondence table, an image parallax closest to the first image parallax is determined as the target image parallax, and a distance corresponding to the target image parallax in the target correspondence table is further determined as the first distance. The target parameter of the control system may also be adjusted according to the first distance, and the media information corresponding to the target parameter may be output, thereby achieving the technical effect of reducing the control costs of the control system, and improving user experience.

In one embodiment, before the obtaining the first distance corresponding to the first image parallax in a target correspondence table, the method further includes: obtaining second image information of the target object by using the target recording device, where the distance between the target object and the target recording device is a first target distance; obtaining a second image parallax between third sub-image information and fourth sub-image information in the second image information, where the third sub-image information is obtained by recording the target object by the first video camera, the fourth sub-image information is obtained by recording the target object by the second video camera, and the second image parallax is used for representing a difference between a third image of the target object indicated by the third sub-image information and a fourth image of the target object indicated by the fourth sub-image information; establishing a correspondence between the first target distance and the second image parallax in the target correspondence table; obtaining third image information of the target object by using the target recording device, where the distance between the target object and the target recording device is a second target distance, and the second target distance is different from the first target distance; obtaining a third image parallax between fifth sub-image information and sixth sub-image information in the third image information, where the fifth sub-image information is obtained by recording the target object by the first video camera, the sixth sub-image information is obtained by recording the target object by the second video camera, and the third image parallax is used for representing a difference between a fifth image of the target object indicated by the fifth sub-image information and a sixth image of the target object indicated by the sixth sub-image information; and establishing a correspondence between the second target distance and the third image parallax in the target correspondence table.

In this embodiment, before the first distance corresponding to the first image parallax is obtained from the target correspondence table, data relationships in the target correspondence table are established. The second image information of the target object in a first target distance from the target recording device is obtained by using the target recording device. The first target distance is a preset distance, for example, D1 meters. The first target distance is a set basic distance, and may be the farthest distance between the target recording device and the target object when the user has 3D experience. The target object is placed at a region in the first target distance from the target recording device, and the second image information obtained by recording the target object is obtained in real time by using the target recording device. After the second image information is obtained, the second image parallax between the third sub-image information and the fourth sub-image information is obtained from the second image information. The second image parallax is used for representing a difference between a third image of the target object indicated by the third sub-image information and a fourth image of the target object indicated by the fourth sub-image information, and the second image parallax is obtained according to the third sub-image information and the fourth sub-image information. For example, the second image parallax is obtained by using a difference between a midpoint horizontal coordinate of a third sub-image and a midpoint horizontal coordinate of a fourth sub-image. The third sub-image information is obtained by recording the target object established in the target correspondence table by the first video camera in the target recording device. The first video camera may be the left camera of the binocular video camera. The fourth sub-image information is obtained by recording the target object by the second video camera in the target recording device. If the first video camera is the left camera of the binocular video camera, the second video camera may be the right camera in the binocular video camera. The correspondence between the first target distance and the second image parallax is established in the target correspondence table.

In some embodiments, the third image information of the target object in a second target distance from the target recording device is obtained by using the target recording device. The second target distance is a preset distance, for example, D2 meters, may be a distance changing relative to the first target distance. For example, the second target distance is a distance changing 5 meters relative to the first distance. The target object is placed at a region in the second target distance from the target recording device, and the third image information obtained by recording the target object is obtained in real time by using the target recording device. After the third image information is obtained, the third image parallax between the fifth sub-image information and the sixth sub-image information is obtained from the third image information. The third image parallax is used for representing a difference between a fifth image of the target object indicated by the fifth sub-image information and a sixth image of the target object indicated by the sixth sub-image information, and the third image parallax is obtained according to the fifth sub-image information and the sixth sub-image information. For example, the third image parallax is obtained by using a difference between a midpoint horizontal coordinate of a fifth sub-image and a midpoint horizontal coordinate of a sixth sub-image. The fifth sub-image information is obtained by recording the target object used for establishing the target correspondence table by the first video camera in the target recording device. The first video camera may be the left camera of the binocular video camera. The sixth sub-image information is obtained by recording the target object by the second video camera in the target recording device. If the first video camera is the left camera of the binocular video camera, the second video camera may be the right camera in the binocular video camera. The correspondence between the second target distance and the third image parallax is established in the target correspondence table.

In this embodiment, the distance between the target recording device and the target object may be continuously changed, to repeat the foregoing steps, or a third correspondence between a third target distance and a fourth image parallax may be established in the target correspondence table, and so on, thereby establishing the target correspondence table including the data relationship between the image parallax and the distance.

The method for establishing the target correspondence table including the data relationship between the image parallax and the distance in this embodiment is merely a preferred implementation of the embodiments of the present disclosure, and it does not mean that the method for establishing the target correspondence table in the present disclosure is merely the foregoing method. Any method that can establish the target correspondence table falls within the scope of the embodiments of the present disclosure, which is not described herein again.

In one embodiment, the obtaining the second image parallax between the third sub-image information and the fourth sub-image information includes: obtaining a third midpoint horizontal coordinate in the third sub-image information, where the third midpoint horizontal coordinate is a horizontal coordinate of a central point of the third image in a target coordinate system; obtaining a fourth midpoint horizontal coordinate in the fourth sub-image information, where the fourth midpoint horizontal coordinate is a horizontal coordinate of a central point of the fourth image in the target coordinate system; and determining a difference between the third midpoint horizontal coordinate and the fourth midpoint horizontal coordinate as the second image parallax; and the obtaining the third image parallax between the fifth sub-image information and the sixth sub-image information comprises: obtaining a fifth midpoint horizontal coordinate in the fifth sub-image information, where the fifth midpoint horizontal coordinate is a horizontal coordinate of a central point of the fifth image in the target coordinate system; obtaining a sixth midpoint horizontal coordinate in the sixth sub-image information, where the sixth midpoint horizontal coordinate is a horizontal coordinate of a central point of the sixth image in the target coordinate system; and determining a difference between the fifth midpoint horizontal coordinate and the sixth midpoint horizontal coordinate as the third image parallax.

In this embodiment, the third midpoint horizontal coordinate in the third sub-image information is obtained during establishment of the target correspondence table. For example, the third sub-image information is screen information acquired by the left camera, and the screen information may be a left portrait. If a central point of the left portrait in the target coordinate system is (X3, Y3), a third midpoint horizontal coordinate of the left portrait is X3. The fourth midpoint horizontal coordinate in the fourth sub-image information is obtained, the fourth sub-image information may be screen information acquired by the right camera, and the screen information may be a right portrait. If a central point of the right portrait in the target coordinate system is (X4, Y4), a fourth midpoint horizontal coordinate of the right portrait is X4. After the third midpoint horizontal coordinate in the third sub-image information, and the fourth midpoint horizontal coordinate in the fourth sub-image information are obtained, the difference between the third midpoint horizontal coordinate and the fourth midpoint horizontal coordinate is obtained, and the difference between the third midpoint horizontal coordinate and the fourth midpoint horizontal coordinate is determined as the second image parallax. That is, (X3-X4) is determined as the second image parallax, and the correspondence between the first target distance and the second image parallax is further established in the target correspondence table.

In some embodiments, the fifth midpoint horizontal coordinate in the fifth sub-image information is obtained. For example, the fifth sub-image information is screen information acquired by the left camera, may be a left portrait. If a central point of the left portrait in the target coordinate system is (X5, Y5), a fifth midpoint horizontal coordinate of the left portrait is X5. The sixth midpoint horizontal coordinate in the sixth sub-image information is obtained, the sixth sub-image information may be screen information acquired by the right camera, and the screen information may be a right portrait. If a central point of the right portrait in the target coordinate system is (X6, Y6), a sixth midpoint horizontal coordinate of the right portrait is X6. After the fifth midpoint horizontal coordinate in the fifth sub-image information, and the sixth midpoint horizontal coordinate in the sixth sub-image information are obtained, the difference between the fifth midpoint horizontal coordinate and the sixth midpoint horizontal coordinate is obtained. The difference between the fifth midpoint horizontal coordinate and the sixth midpoint horizontal coordinate is determined as the third image parallax. That is, (X5-X6) is determined as the third image parallax, and the correspondence between the second target distance and the third image parallax is further established in the target correspondence table.

In the target correspondence table, the correspondence between other target distances and the image parallax may also be established by using the foregoing method, which is not described herein by using examples.

In one embodiment, the obtaining a third midpoint horizontal coordinate in the third sub-image information includes at least one of the following: determining an average value between a horizontal coordinate of a central point of a left-eye image in the target coordinate system and a horizontal coordinate of a central point of a right-eye image in the target coordinate system as the first midpoint horizontal coordinate if the first image information is image information of a face; determining a horizontal coordinate of a central point of a nose sub-image in the target coordinate system as the first midpoint horizontal coordinate if the first image information is the image information of the face; determining an average value between a horizontal coordinate of a central point of a left-hand image in the target coordinate system and a horizontal coordinate of a central point of a right-hand image in the target coordinate system as the first midpoint horizontal coordinate if the first image information is image information of a portrait; and determining an average value between a horizontal coordinate of a central point of a left-arm image in the target coordinate system and a horizontal coordinate of a central point of a right-arm image in the target coordinate system as the first midpoint horizontal coordinate if the first image information is the image information of the portrait.

In this embodiment, an open-source face recognition algorithm may be used, to obtain an image region acquired by the first video camera and the second video camera in the target recording device. For example, the open-source face recognition algorithm is used, to obtain a portrait region of the left camera and the right camera, and the third midpoint horizontal coordinate of the third sub-image information and the fourth midpoint horizontal coordinate in the fourth sub-image information are calculated respectively according to a rule, to respectively obtain the horizontal coordinate of the left camera and the horizontal coordinate of the right camera. The foregoing rule may be, but is not limited to the following rules:

If the second image information is image information of a face, an average coordinate of pixel coordinates of two eyes in the face is determined as the third midpoint horizontal coordinate, that is, an average value of pixel coordinate values of the two eyes in the face is determined as the third midpoint horizontal coordinate; if the second image information is the image information of the face, a pixel coordinate of the nose in the face is determined as the third midpoint horizontal coordinate; if the second image information is image information of a portrait, an average coordinate of pixel coordinates of the left hand and the right hand in the portrait is determined as the third midpoint horizontal coordinate, that is, an average value of pixel coordinate values of the left hand and the right hand in the portrait is determined as the third midpoint horizontal coordinate; and if the second image information is the image information of the portrait, an average value of pixel coordinate values of the left arm and the right arm in the portrait is determined as the third midpoint horizontal coordinate, that is, an average value of the pixel coordinate values of the left arm and the right arm in the portrait is determined as the third midpoint horizontal coordinate.

The methods for obtaining the first midpoint horizontal coordinate, the second midpoint horizontal coordinate, the fourth midpoint horizontal coordinate, and the fifth midpoint horizontal coordinate in this embodiment may be obtained by using the foregoing rules for determining the third midpoint horizontal coordinate, which are not described herein by using examples.

In one embodiment, the adjusting a target parameter of the control system according to the first distance includes: increasing a sound parameter of the control system if a status change of the first distance indicates that the first distance is reduced, where the target parameter includes the sound parameter, the media information includes sound information, and the sound parameter is used for controlling the control system to output the sound information to the VR device; and decreasing the sound parameter of the control system if the status change of the first distance indicates that the first distance increased.

The target parameter in this embodiment may include a sound parameter. When the target parameter of the control system is adjusted according to the first distance, if the status change of the first distance indicates that the first distance is reduced, the sound parameter of the control system is increased, so that when a user performs experiencing by using virtual glasses, if the target object is closer to the user, the user may hear louder sound. In some embodiments, the sound intensity (unit: dB) is inversely proportional to the square of the first distance. If the status change of the first distance indicates that the first distance increased, the sound parameter of the control system is decreased, so that when the target object is farther to the user, the user may hear quieter sound. In this way, when an actor is shot by using the binocular video camera, the control system may also automatically detect the change of the distance between the target object and the target recording device, and adjust the control system in real time to output sound information to the VR device, that is, adjust the sound received by the user, so that the user may experience a more real scene when watching a stage performance, to simulate face-to-face live or communication experience between the user and the actor.

In one embodiment, the adjusting a target parameter of the control system according to the first distance includes: adjusting a light parameter of the control system to a first value if status change of the first distance indicates that the first distance is reduced, so that light of the control system is focused within a target region of the target recording device, where the target parameter includes the light parameter, the media information includes light information, and the light parameter is used for controlling the control system to output the light information to the VR device; and adjusting the light parameter of the control system to a second value if the status change of the first distance indicates that the first distance increased, so that the light of the control system is focused beyond the target region of the target recording device.

The target parameter in this embodiment may include a light parameter. When the target parameter of the control system is adjusted according to the first distance, if the status change of the first distance indicates that the first distance is reduced, the light parameter of the control system is adjusted as a first value, and the light parameter of the first value focuses the light of the control system within a target region of the target recording device, so that when the distance between the target object and the target recording device is reduced, for example, when the distance between the item/actor and the camera is reduced, the light PTZ may automatically move the light focus to a region close to the camera. If the status change of the first distance indicates that the first distance increased, the light parameter of the control system is adjusted as a second value, the light parameter of the second value focuses the light of the control system beyond the target region of the target recording device, so that the spotlight moves as the actors move around, to ensure that good light shines on the actor.

In one embodiment, the obtaining a first distance corresponding to the first image information in step S204 includes: obtaining the first distance corresponding to the first image information by using a central computing device in the control system, where the central computing device is connected to the target recording device; and the adjusting a target parameter of the control system according to the first distance includes: receiving, by using a controller in the control system, the first distance transmitted by the computing center device, and adjusting the target parameter of the control system according to the first distance.

The control system in this embodiment includes a target recording device, a computing center device, and a controller. The target recording device may be a binocular video camera. The target recording device is configured to acquire first image information in real time, and transmit the first image information to the computing center device. The first image information may be a binocular picture or video. The target recording device is connected to the central computing device in a wireless or wired manner. The wireless manner may be microwave communication, infrared communication, laser communication, and the like, and the wired manner may be a universal serial bus (USB), a cable, and the like, which are not limited herein. The central computing device obtains the first distance corresponding to the first image information. For example, the central computing device is configured to complete processing for the binocular picture or video, to obtain the first distance between the target object and the target recording device, for example, establish a data relationship between an image parallax and depth information, calculate the image parallax in real time, obtain depth data in real time, and transmit a control instruction to the controller. The controller receives the first distance transmitted by the computing center device, triggers control logics of the controller, and adjusts the target parameter of the control system according to the first distance. The media information corresponding to the target parameter is output by using the controller.

In this embodiment, the principle that the target recording device shoots different image parallaxes of the same target object in different distances is used. A correspondence between distances and corresponding image parallaxes is obtained according to an actual measurement or optical simulation method, and the distance between the target object and the camera is further calculated at low costs in real time according to the image parallax in the image information of the target object, to complete automatic control of the stage light and audio, thereby achieving the technical effect of reducing control costs of the control system, and improving user experience.

For ease of description, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also understand that the embodiments described in this specification all belong to exemplary embodiments, and the involved actions and modules are not necessarily mandatory to the present disclosure.

Based on the foregoing descriptions of the embodiments, a person skilled in the art may clearly understand that the method in the foregoing embodiments may be implemented by software in addition to a necessary universal hardware platform or by hardware only. However, the former is a better implementation in most cases. Based on such an understanding, the technical solutions of the present disclosure or the part that makes contributions to the related technology may be substantially embodied in the form of a software product. The computer software product is stored in a storage medium (for example, a read-only memory (ROM)/random access memory (RAM), a magnetic disk, or an optical disc), and contains several instructions for instructing a terminal device (which may be a mobile phone, a computer, a server, or a network device) to perform the method according to the embodiments of the present disclosure.

The following describes the technical solutions of the present disclosure with reference to preferred embodiments.

In this embodiment, the principle that the binocular camera shoots different parallaxes of the same item/user in different distances is used. A correspondence between different depth distances of the item and corresponding image parallaxes is obtained according to an actual measurement or optical simulation method, and the distance between the item/user and the camera is calculated at low costs in real time, to complete automatic control of the stage light and audio.

The following describes a construction module of a stage control system based on a binocular camera in this embodiment.

Figure 3:
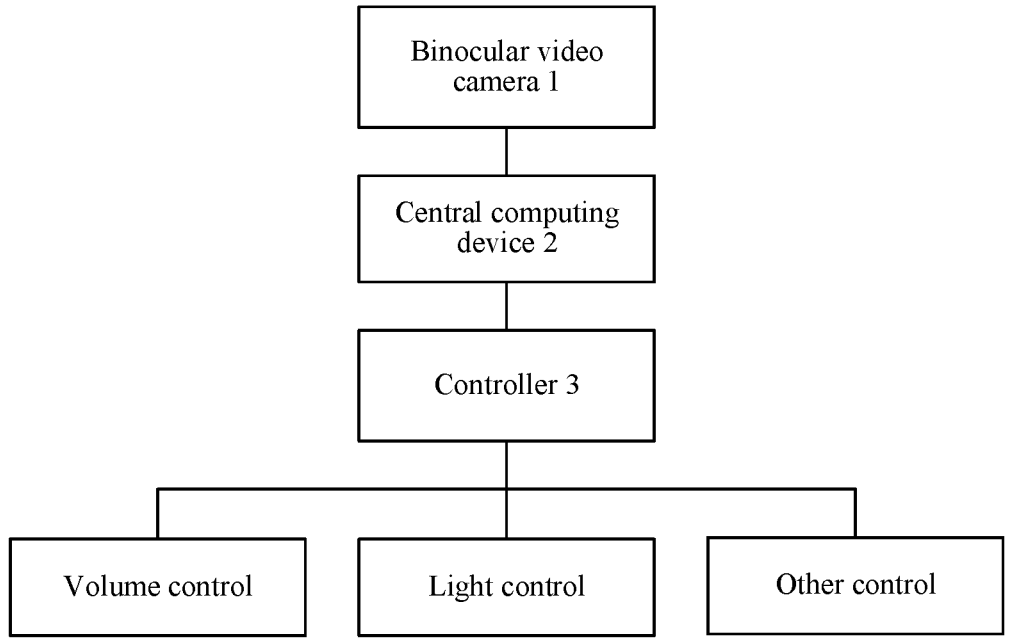
FIG. 3 is a schematic diagram of a control system according to an embodiment of the present disclosure.

FIG. 3 is a schematic diagram of a control system according to an embodiment of the present disclosure. As shown in FIG. 3, the control system includes: a binocular video camera 1, a central computing device 2, and a controller 3.

The binocular video camera 1 is a first module of a stage control system, and is configured to acquire information about a binocular picture or video of an object in real time, and transmit the information to the central computing device 2.

The central computing device 2 is a second module of the stage control system, and is configured to complete processing for the binocular picture or video, to obtain a real-time distance between a user and a camera, and transmit a control instruction to the controller 3.

The controller 3 is a third module of the stage control system, and is configured to receive the control instruction of the central computing device 2, and complete other control for a volume controller (volume control), a light regulator (light control), and the like by using the control instruction.

The following describes the binocular video camera in the embodiments of the present disclosure.

The binocular video camera acquires screens in real time by using two cameras, and transmits the images to the computing center device. The binocular video camera is connected to the computing center device, and may be connected to the central computing device in a wireless or wired (such as a USB or a cable) manner, which is not limited herein.

The following describes the central computing device in the embodiments of the present disclosure.

Figure 4:
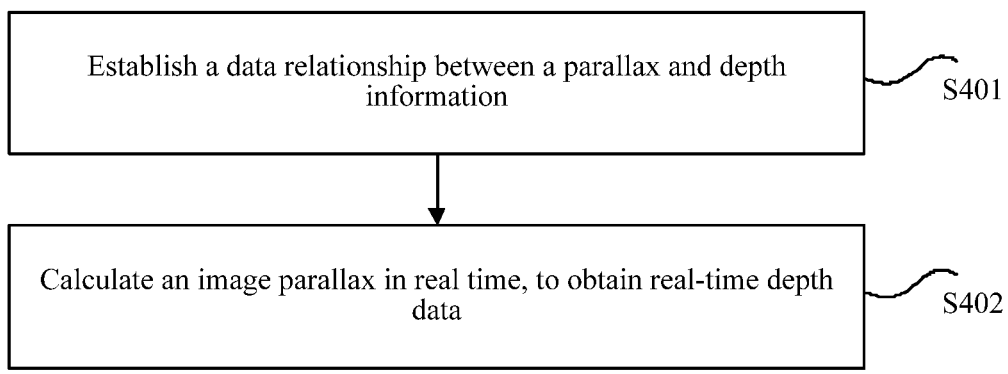
FIG. 4 is a flowchart of a method for operating a computing device of a control system according to an embodiment of the present disclosure.

FIG. 4 is a flowchart of a method for processing a central computing device of a control system according to an embodiment of the present disclosure. As shown in FIG. 4, the method includes the following steps.

Step S401. Establish a data relationship between a parallax and depth information.

First, an item is placed at a region in a distance of D1 meters (D1 meters are a known value) from the camera, and the central computing device obtains a real-time screen (a binocular picture or video) acquired and shot by the binocular video camera. In some embodiments, the central computing device obtains a portrait region of a left camera and a right camera by using an open-source face recognition algorithm, and calculates midpoint horizontal coordinates of a left portrait and a right portrait respectively according to a rule. For example, the midpoint horizontal coordinate of the left portrait is x1 of the left camera, and the midpoint horizontal coordinate of the right portrait is x2 of the right camera.

In some embodiments, the foregoing rule for calculating the midpoint horizontal coordinates of the left portrait and the right portrait respectively may be, but is not limited to the following types: an average value of a sum of pixel coordinate of two eyes in a face; a pixel coordinate of the nose in the face; an average value of a sum of pixel coordinates of a left hand and a right hand in a portrait; and an average value of a sum of pixel coordinates of a left arm and a right arm in the portrait.

Then, a difference between the midpoint horizontal coordinate x1 of the left portrait and the midpoint horizontal coordinate x2 of the right portrait in a left camera screen and a right camera screen is calculated.

Finally, a distance D2 (D2 is a known value) between the camera and the item is continuously changed, and a difference between horizontal coordinates of central pixel points of the left portrait and the right portrait is calculated.

By repeating the foregoing steps, the difference between the midpoint horizontal coordinate x1 of the left portrait and the midpoint horizontal coordinate x2 of the right portrait may be obtained in different distance situations, and a correspondence between parallaxes and distances of the left video camera and the right video camera for the same item may be obtained.

Figure 5:
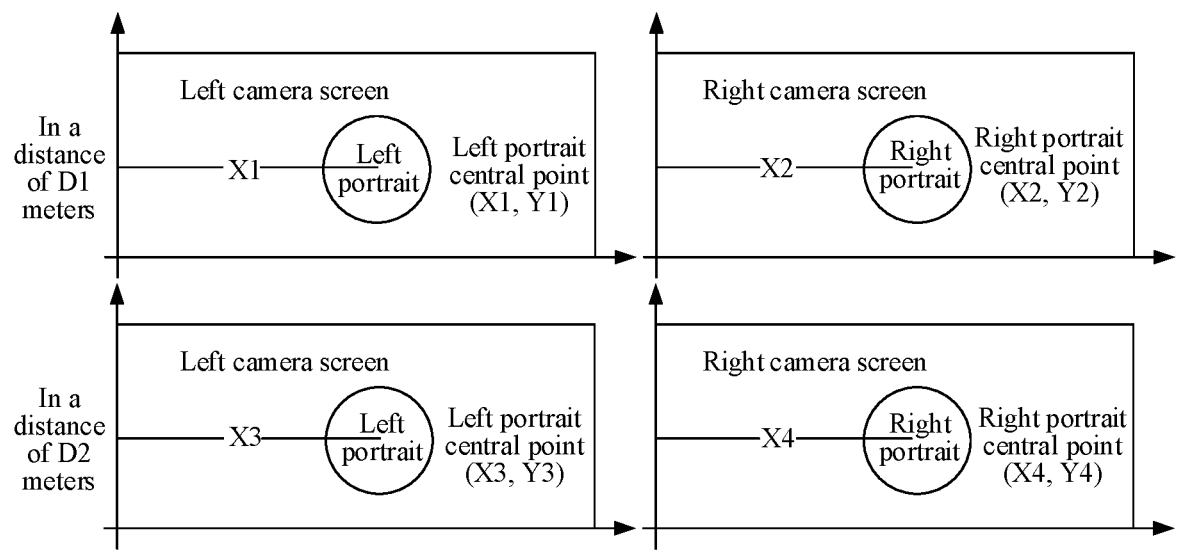
FIG. 5 is a schematic diagram of a correspondence between a parallax and a distance according to an embodiment of the present disclosure.

FIG. 5 is a schematic diagram of a correspondence between a parallax and a distance according to an embodiment of the present disclosure. As shown in FIG. 5, the distance of D1 meters is corresponding to an image parallax between the midpoint horizontal coordinate X1 of the left camera screen and the midpoint horizontal coordinate X2 of the right camera screen. The left portrait central point is (X1, Y1), and the right portrait central point is (X2, Y2). The distance of D2 meters is corresponding to a parallax between the midpoint horizontal coordinate X3 of the left camera screen and the midpoint horizontal coordinate X4 of the right camera screen. The left portrait central point is (X3, Y3), and the right portrait central point is (X4, Y4).

Step S402. Calculate an image parallax in real time, to obtain real-time depth data.

First, the central computing device obtains in real time the left camera screen and the right camera screen transmitted by the binocular video camera. Based on the foregoing method, a real-time difference between the midpoint horizontal coordinate X1 of the left portrait and the midpoint horizontal coordinate X2 of the right portrait may be obtained.

Then, a reverse lookup is performed according to the correspondence between the image parallaxes and the distances of the same item in the left video camera and the right video camera, to obtain a distance between the item and the camera at the current time point.

The following describes the controller in the embodiments of the present disclosure.

The central computing device transmits the real-time distance between the item/actor and the camera to the controller, and triggers control logics of the controller, which include the following logics: first, a logic related to volume, where when the distance between the item/actor and the camera is reduced, the control system automatically raises the volume, and the value rule for the adjustment is not limited herein (but may follow the principle that the sound intensity (unit: dB) is inversely proportional to the square of the distance); second, a logic related to light, where when the distance between the item/actor and the camera is reduced, the light PTZ automatically moves the light focus to a region close to the camera, and the value rule for the adjustment is not limited herein.

For an application environment of this embodiment of the present disclosure, reference may be made to, but not limited to, the application environment in the foregoing embodiment, which is not described herein again in this embodiment. This embodiment of the present disclosure provides an optional specific application used for implementing the foregoing method for operating a control system.

Figure 6:
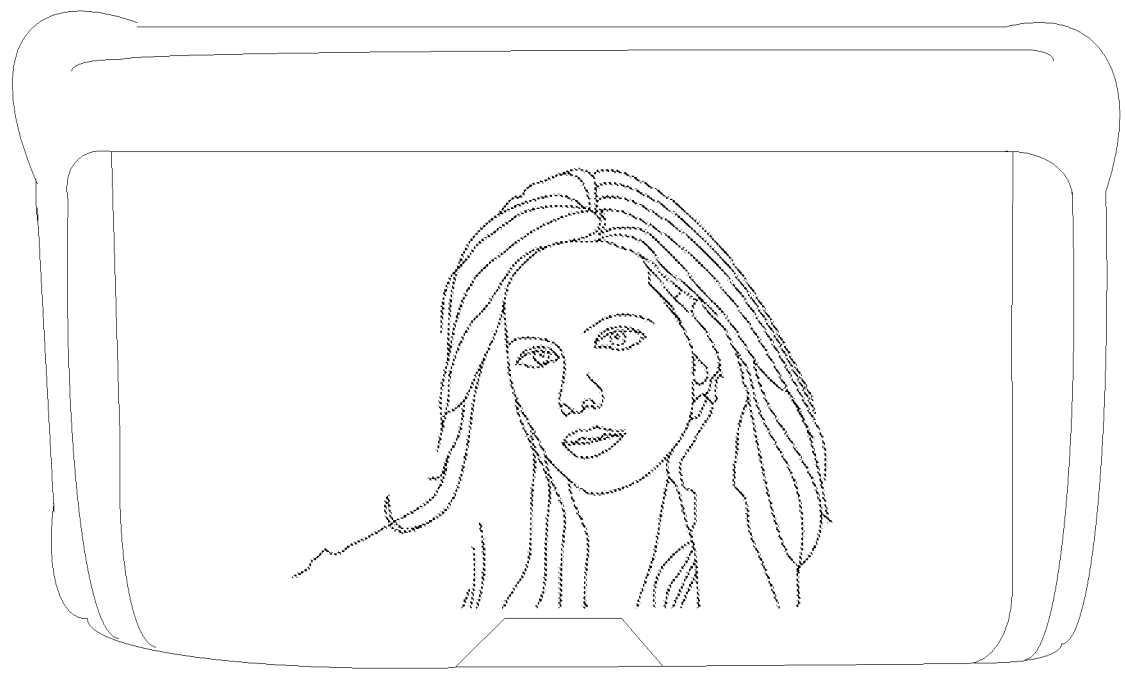
FIG. 6 is a schematic diagram of a control effect of experiencing a control system by using virtual glasses according to an embodiment of the present disclosure.
Figure 7:
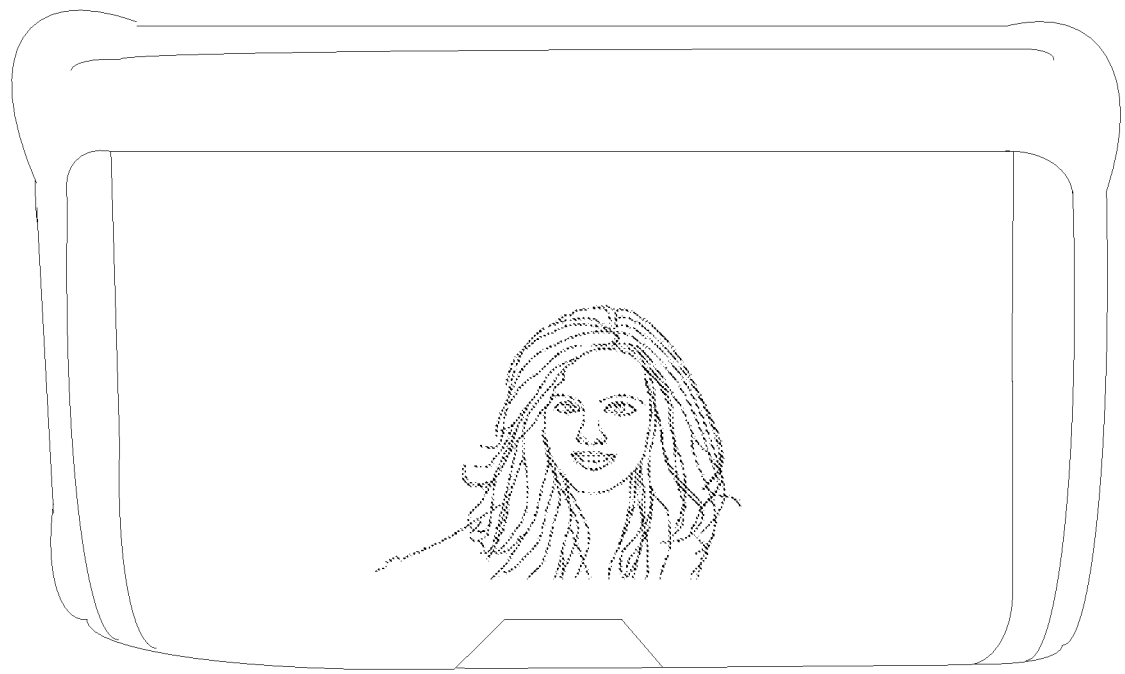
FIG. 7 is a schematic diagram of another control effect of experiencing a control system by using virtual glasses according to an embodiment of the present disclosure.

FIG. 6 is a schematic diagram of a control effect of experiencing a control system by using virtual glasses according to an embodiment of the present disclosure. FIG. 7 is a schematic diagram of another control effect of experiencing a control system by using virtual glasses according to an embodiment of the present disclosure. As can be known from the display screens shown in FIG. 6 to FIG. 7, the image of the anchor/actor is decreased, and a status change of a distance from the binocular camera indicates that the distance between the anchor/actor and the binocular camera increased. In this case, the sound parameter of the control system is decreased automatically, so that the user can hear quieter sound. As can be known from the display screens shown in FIG. 7 to FIG. 6, the image of the anchor/actor is increased, and the status change of the distance between the anchor/actor and the binocular camera indicates that the distance between the anchor/actor and the binocular camera is reduced. In this case, the sound parameter of the control system is automatically increased, so that the user can hear louder sound. In this way, when the anchor/actor performs live online in real time by using the binocular camera, even without the help of assistants, the anchor/actor may still alone implement dynamic control of audio as the position changes, so that the user can hear more real sound, to further ensure face-to-face similar experience between the user and the actor when the user watches a live by using virtual glasses.

Figure 8:
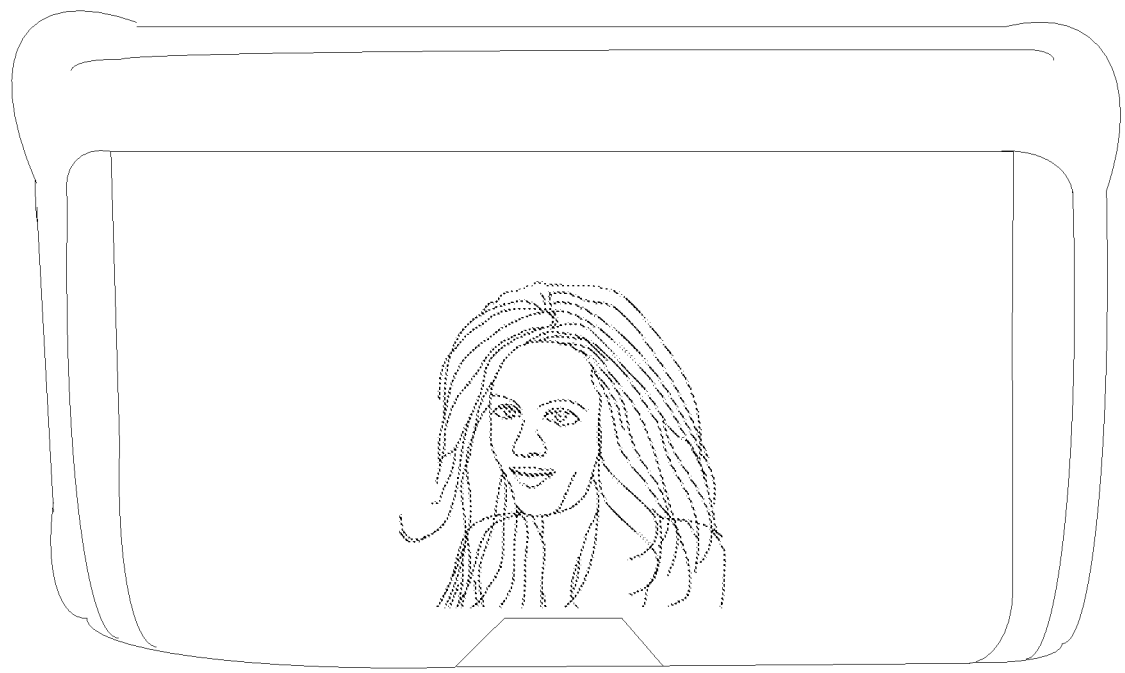
FIG. 8 is a schematic diagram of another control effect of experiencing a control system by using virtual glasses according to an embodiment of the present disclosure.

FIG. 8 is a schematic diagram of another control effect of experiencing a control system by using virtual glasses according to an embodiment of the present disclosure. As shown in FIG. 7 and FIG. 8, the image of the anchor/actor is increased, the status change of the distance between the anchor/actor and the binocular camera indicates that the distance is reduced, the light parameter of the control system is adjusted, and the adjusted light parameter focuses the light of the control system within the target region of the target recording device. In this way, when the distance between the target object and the target recording device is reduced, the light PTZ may automatically move the light focus to a region close to the camera. As can be known from the display screens shown in FIG. 8 to FIG. 7, the image of the anchor/actor is decreased, the status change of the distance between the anchor/actor and the binocular camera indicates that the distance increased, the light parameter of the control system is adjusted, and the adjusted light parameter focuses the light of the control system beyond the target region of the target recording device. In this way, the anchor/actor may alone implement dynamic control of the light as the position changes, to move the spotlight as the actor moves around, so that the user can see more real images, to further ensure face-to-face similar experience between the user and the actor when the user watches a live by using virtual glasses.

In this embodiment, when the actor is shot by using the binocular video camera, the control system may automatically detect the change of the distance between the actor and the camera, and adjust in real time the sound received by the user, to simulate face-to-face live or communication experience. When the anchor is closer to the user, the sound is louder, and when the anchor is farther from the user, the sound is quieter, so that the user experiences more real sound. The spotlight moves as the actor moves around, to ensure that good light shines on the actor, thereby achieving the light following objective, to ensure that good light shines on the actor.

Figure 9:
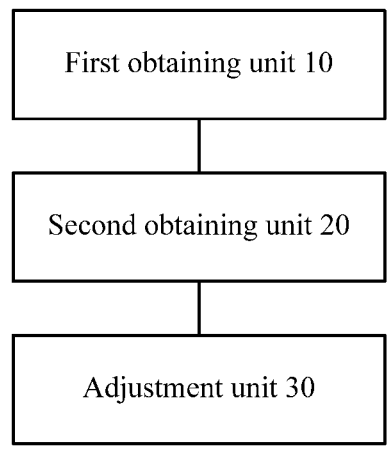
FIG. 9 is a schematic diagram of an apparatus for operating a control system according to an embodiment of the present disclosure.

According to another aspect of the embodiments of the present disclosure, an apparatus for operating a control system configured to implement the foregoing method for operating a control system is further provided. The apparatus includes one or more processors and one or more memories storing a program unit, the program unit is executed by the processor, and the program unit includes a first obtaining unit, a second obtaining unit, and an adjustment unit. FIG. 9 is a schematic diagram of an apparatus for operating a control system according to an embodiment of the present disclosure. As shown in FIG. 9, the apparatus may include: a first obtaining unit 10, a second obtaining unit 20 and an adjustment unit 30.

The first obtaining unit 10 is configured to obtain, by using a target recording device in a control system, first image information of a target object currently moving in a real scene.

The second obtaining unit 20 is configured to obtain a first distance corresponding to the first image information, the first distance being a distance between the target recording device and the target object.

The adjustment unit 30 is configured to adjust a target parameter of the control system according to the first distance, the target parameter being used for controlling the control system to output media information to a VR device, the VR device being connected to the control system, and the media information being corresponding to movement information of the target object moving in the real scene, and the movement information including the first distance.

The first obtaining unit 10, the second obtaining unit 20, and the adjustment unit 30 may be run in a terminal as a part of the apparatus, functions implemented by the foregoing units may be performed by using a processor in the terminal, and the terminal may also be a terminal device such as a smartphone (for example, an Android mobile phone or an iOS mobile phone), a tablet computer, a palmtop computer, a mobile Internet device (MID), or a PAD.

In some embodiments, the second obtaining unit 20 in this embodiment includes: a first obtaining module and a second obtaining module. The first obtaining module is configured to obtain a first image parallax between first sub-image information and second sub-image information in the first image information, where the first sub-image information is obtained by recording the target object by a first video camera, the second sub-image information is obtained by recording the target object by a second video camera, the first video camera and the second video camera are deployed in the target recording device, and the first image parallax is used for representing a difference between a first image of the target object indicated by the first sub-image information and a second image of the target object indicated by the second sub-image information; and the second obtaining module is configured to obtain the first distance corresponding to the first image parallax in a target correspondence table.

The first obtaining module and the second obtaining module may be run in the terminal as a part of the apparatus, and the processor in the terminal may be used for performing the functions implemented by the foregoing modules.

In some embodiments, the first obtaining module in this embodiment includes: a first obtaining submodule, a second obtaining submodule, and a determining submodule. The first obtaining submodule is configured to obtain a first midpoint horizontal coordinate in the first sub-image information, where the first midpoint horizontal coordinate is a horizontal coordinate of a central point of the first image in a target coordinate system. The second obtaining submodule is configured to obtain a second midpoint horizontal coordinate in the second sub-image information, where the second midpoint horizontal coordinate is a horizontal coordinate of a central point of the second image in the target coordinate system. The determining submodule is configured to determine a difference between the first midpoint horizontal coordinate and the second midpoint horizontal coordinate as the first image parallax.

The first obtaining submodule, the second obtaining submodule, and the determining submodule may be run in the terminal as a part of the apparatus, and functions implemented by the foregoing modules may be performed by using the processor in the terminal.

The first obtaining unit 10 in this embodiment may be configured to perform step S202 in the embodiments of this application, the second obtaining unit 20 in this embodiment may be configured to perform step S204 in the embodiments of this application, and the adjustment unit 30 in this embodiment may be configured to perform step S206 in the embodiments of this application.

Examples and application scenarios implemented by the foregoing units and modules and the corresponding steps are the same, but are not limited to the content disclosed in the foregoing embodiments. The foregoing modules may run in the hardware environment shown in FIG. 1 as a part of the apparatus, may be implemented by using software, or may be implemented by using hardware. The hardware environment includes a network environment.

In this embodiment, the first obtaining unit 10 obtains, by using a target recording device in a control system, first image information of a target object currently moving in a real scene; the second obtaining unit 20 obtains a first distance corresponding to the first image information, the first distance being a distance between the target recording device and the target object; and the adjustment unit 30 adjusts a target parameter of the control system according to the first distance, the target parameter being used for controlling the control system to output media information to a VR device, the VR device being connected to the control system, the media information being corresponding to movement information of the target object moving in the real scene, and the movement information including the first distance, thereby achieving the technical effect of reducing control costs of the control system, and further resolving the technical problem of large control costs of the control system in the related technology.

According to another aspect of the embodiments of the present disclosure, an electronic apparatus configured to implement the foregoing method for operating a control system is further provided.

In an optional implementation, the electronic apparatus in this embodiment is deployed in the control system as a part of the control system in the embodiments of the present disclosure. For example, the electronic apparatus is deployed in the control system 104 shown in FIG. 1, and is configured to perform the method for operating a control system in the embodiments of the present disclosure. The control system is connected to the VR device. The VR device includes, but is not limited to, a VR helmet, VR glasses, a VR all-in-one machine, or the like, and is configured to receive media information outputted by the control system, for example, receive sound information, light information, or the like outputted by the control system.

In another optional implementation, the electronic apparatus in this embodiment may be connected to the control system in the embodiments of the present disclosure as an independent part. For example, the electronic apparatus is connected to the control system 104 shown in FIG. 1, and is configured to perform the method for operating a control system in the embodiments of the present disclosure. The control system is connected to the VR device by using the electronic apparatus. The VR device includes, but is not limited to, a VR helmet, VR glasses, a VR all-in-one machine, or the like, and is configured to receive, by using the electronic apparatus, media information outputted by the control system, for example, receive, by using the electronic apparatus, sound information, light information, or the like outputted by the control system.

Figure 10:
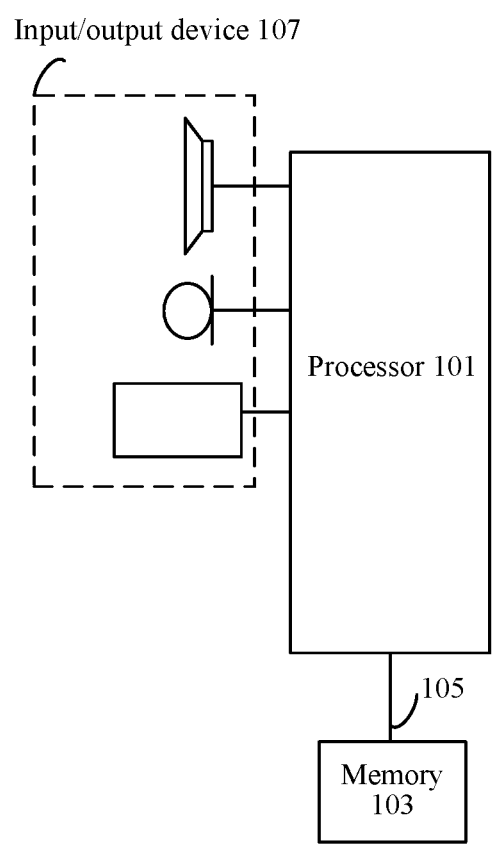
FIG. 10 is a structural block diagram of an electronic apparatus according to an embodiment of the present disclosure.

FIG. 10 is a structural block diagram of an electronic apparatus according to an embodiment of the present disclosure. As shown in FIG. 10, the electronic apparatus may include one or more processors 101 (where only one processor is shown in the figure) and a memory 103. The memory 103 may store a computer program. The processor 101 may be configured to run the computer program to perform the method for operating a control system in the embodiments of the present disclosure.

In some embodiments, the memory 103 may be configured to store the computer program and a module, for example, a program instruction/module corresponding to the method and the apparatus for operating a control system in the embodiments of the present disclosure. The processor 101 is configured to run a software program and a module that are stored in the memory 103 to execute various functional applications and perform data processing, that is, implement the foregoing method for operating a control system. The memory 103 may include a high-speed random memory, and may also include a nonvolatile memory such as one or more magnetic storage apparatuses, a flash memory, or another nonvolatile solid-state memory. In some instances, the memory 103 may further include a memory that is remotely disposed relative to the processor 101, and the remote memory may be connected to the electronic apparatus through a network. Examples of the network include, but are not limited to, the Internet, an intranet, a local area network, a mobile communications network, and a combination thereof.

In some embodiments, as shown in FIG. 10, the electronic apparatus may further include a transmission apparatus 105 and an input/output device 107. The transmission apparatus 105 is configured to receive or transmit data through a network, or may be used for data transmission between the processor and the memory. Specific examples of the network may include a wired network and a wireless network. In an embodiment, the transmission apparatus 105 includes a network interface controller (NIC) that may be connected to another network device and a router by using a network cable, thereby communicating with the Internet or a local area network. In an embodiment, the transmission apparatus 105 is a radio frequency (RF) module that is configured to communicate with the Internet in a wireless manner.

Specifically, the memory 103 is configured to store the computer program.

The processor 101 may be configured to invoke, by running the transmission apparatus 105, the computer program stored in the memory 103, so as to perform the following steps: obtaining, by using a target recording device in a control system, first image information of a target object currently moving in a real scene; obtaining a first distance corresponding to the first image information, the first distance being a distance between the target recording device and the target object; and adjusting a target parameter of the control system according to the first distance, the target parameter being used for controlling the control system to output media information to a VR device, the VR device being connected to the control system, the media information being corresponding to movement information of the target object moving in the real scene, and the movement information including the first distance.

The processor 101 is further configured to perform the following steps: obtaining a first image parallax between first sub-image information and second sub-image information in the first image information, where the first sub-image information is obtained by recording the target object by a first video camera, the second sub-image information is obtained by recording the target object by a second video camera, the first video camera and the second video camera are deployed in the target recording device, and the first image parallax is used for representing a difference between a first image of the target object indicated by the first sub-image information and a second image of the target object indicated by the second sub-image information; and obtaining the first distance corresponding to the first image parallax in a target correspondence table.

The processor 101 is further configured to perform the following steps: obtaining a first midpoint horizontal coordinate in the first sub-image information, where the first midpoint horizontal coordinate is a horizontal coordinate of a central point of the first image in a target coordinate system; obtaining a second midpoint horizontal coordinate in the second sub-image information, where the second midpoint horizontal coordinate is a horizontal coordinate of a central point of the second image in the target coordinate system; and determining a difference between the first midpoint horizontal coordinate and the second midpoint horizontal coordinate as the first image parallax.

The processor 101 is further configured to perform the following steps: looking up the target correspondence table for a target image parallax with a minimum difference from the first image parallax; and determining a distance corresponding to the target image parallax in the target correspondence table as the first distance.

The processor 101 is further configured to perform the following steps: before the obtaining the first distance corresponding to the first image parallax in a target correspondence table, obtaining second image information of the target object by using the target recording device, where the distance between the target object and the target recording device is a first target distance; obtaining a second image parallax between third sub-image information and fourth sub-image information in the second image information, where the third sub-image information is obtained by recording the target object by the first video camera, the fourth sub-image information is obtained by recording the target object by the second video camera, and the second image parallax is used for representing a difference between a third image of the target object indicated by the third sub-image information and a fourth image of the target object indicated by the fourth sub-image information; establishing a correspondence between the first target distance and the second image parallax in the target correspondence table; obtaining third image information of the target object by using the target recording device, where the distance between the target object and the target recording device is a second target distance, and the second target distance is different from the first target distance; obtaining a third image parallax between fifth sub-image information and sixth sub-image information in the third image information, where the fifth sub-image information is obtained by recording the target object by the first video camera, the sixth sub-image information is obtained by recording the target object by the second video camera, and the third image parallax is used for representing a difference between a fifth image of the target object indicated by the fifth sub-image information and a sixth image of the target object indicated by the sixth sub-image information; and establishing a correspondence between the second target distance and the third image parallax in the target correspondence table.

The processor 101 is further configured to perform the following steps: obtaining a third midpoint horizontal coordinate in the third sub-image information, where the third midpoint horizontal coordinate is a horizontal coordinate of a central point of the third image in a target coordinate system; obtaining a fourth midpoint horizontal coordinate in the fourth sub-image information, where the fourth midpoint horizontal coordinate is a horizontal coordinate of a central point of the fourth image in the target coordinate system; and determining a difference between the third midpoint horizontal coordinate and the fourth midpoint horizontal coordinate as the second image parallax; obtaining a fifth midpoint horizontal coordinate in the fifth sub-image information, where the fifth midpoint horizontal coordinate is a horizontal coordinate of a central point of the fifth image in the target coordinate system; obtaining a sixth midpoint horizontal coordinate in the sixth sub-image information, where the sixth midpoint horizontal coordinate is a horizontal coordinate of a central point of the sixth image in the target coordinate system; and determining a difference between the fifth midpoint horizontal coordinate and the sixth midpoint horizontal coordinate as the third image parallax.

The processor 101 is further configured to perform the following steps: increasing a sound parameter of the control system if a status change of the first distance indicates that the first distance is reduced, where the target parameter includes the sound parameter, the media information includes sound information, and the sound parameter is used for controlling the control system to output the sound information to the VR device; and decreasing the sound parameter of the control system if the status change of the first distance indicates that the first distance increased.

The processor 101 is further configured to perform the following steps: adjusting a light parameter of the control system to a first value if a status change of the first distance indicates that the first distance is reduced, so that light of the control system is focused within a target region of the target recording device, where the target parameter includes the light parameter, the media information includes light information, and the light parameter is used for controlling the control system to output the light information to the VR device; and adjusting the light parameter of the control system to a second value if the status change of the first distance indicates that the first distance increased, so that the light of the control system is focused beyond the target region of the target recording device.

The processor 101 is further configured to perform the following steps: obtaining the first distance corresponding to the first image information by using a central computing device in the control system, where the central computing device is connected to the target recording device; and receiving, by using a controller in the control system, the first distance transmitted by the computing center device, and adjusting the target parameter of the control system according to the first distance.

In some embodiments, the input/output device 107 in this embodiment is connected to the VR device, and the processor 101 may output, by using the input/output device 107, media information corresponding to the target parameter to the VR device, for example, output sound information, light information, and the like.

In some embodiments, the input/output device 107 includes, but is not limited to, an audio device, configured to output sound information, and further includes a light device, configured to output light information, and include other devices configured to output media information.

The functions implemented by the input/output device 107 are merely preferred implementations of the embodiments of the present disclosure, and may further include other input/output functions of the control system. Any input/output device that can achieve the technical effect of reducing control costs of the control system, and resolve the technical problem of large control costs of the control system falls within the protection scope of the present disclosure, which is not described herein by using examples.

In some embodiments, if the electronic apparatus in this embodiment of the present disclosure is deployed in the control system, the electronic apparatus includes: a target recording device, a computing center device, and a controller. For example, the processor 101 in the electronic apparatus includes: a target recording device, a computing center device, and a controller. The target recording device is configured to obtain first image information of a target object currently moving a real scene. The central computing device is configured to obtain a first distance corresponding to the first image information, where the central computing device is connected to the target recording device; the controller is configured to receive the first distance transmitted by the computing center device, and adjust a target parameter of the control system according to the first distance. The controller outputs, by using the input/output device 107, media information corresponding to the target parameter to a VR device, for example, output sound information, light information, and the like.

In some embodiments, if the electronic apparatus in this embodiment is connected to the control system in this embodiment of the present disclosure, the control system includes: a target recording device, a computing center device, and a controller. The electronic apparatus obtains, by using the target recording device of the control system, first image information of a target object currently moving a real scene. The electronic apparatus obtains a first distance corresponding to the first image information by using the central computing device in the control system, where the central computing device may be connected to the target recording device. The electronic apparatus receives, by using the controller of the control system, the first distance transmitted by the computing center device, and adjusts a target parameter of the control system according to the first distance, and further outputs, by using the input/output device 107, media information corresponding to the target parameter to a VR device, for example, output sound information, light information, and the like.

By means of the embodiments of the present disclosure, first image information of a current target object is obtained by using a target recording device of a control system, where the target object moves in a real scene; a first distance corresponding to the first image information is obtained, where the first distance is a distance between the target recording device and the target object; a target parameter of the control system is adjusted according to the first distance; and media information corresponding to the target parameter is output. According to the correspondence between the image information and the distance, the first distance between the target recording device and the target object may be obtained at low cost by using the first image information of the target object, and the target parameter of the control system may further be adjusted according to the first distance, to control, by using the target parameter, the control system to output the media information corresponding to the movement information of the target object to the VR device, thereby avoiding manually adjusting the target parameter of the control system, achieving the objective of controlling, by using the target parameter of the control system, the control system to output the media information to the VR device, achieving the technical effect of reducing control costs of the control system, and further resolving the technical problem of large control costs of the control system in the related technology.

In some embodiments, reference may be made to the examples described in the foregoing embodiments for specific examples in this embodiment. Details are not described in this embodiment.

A person of ordinary skill in the art may understand that, the structure shown in FIG. 10 is only schematic. The electronic apparatus may be an electronic apparatus such as a smartphone (such as an Android mobile phone or an iOS mobile phone), a tablet computer, a palmtop computer, a mobile Internet device (MID), or a PAD. FIG. 10 does not limit the structure of the foregoing electronic apparatus. For example, the electronic apparatus may further include more or fewer components (such as a network interface and a display apparatus) than those shown in FIG. 10, or have a configuration different from that shown in FIG. 10.

A person of ordinary skill in the art may understand that all or some of the steps of the methods of the foregoing embodiments may be implemented by a program instructing relevant hardware of the electronic apparatus. The program may be stored in a computer readable storage medium. The storage medium may be a flash disk, a ROM, a RAM, a magnetic disk, or an optical disc.

The embodiments of the present disclosure further provide a storage medium. In this embodiment, the storage medium stores a computer program. The computer program is configured to perform the method for operating a control system.

In this embodiment, the storage medium may be located in at least one of a plurality of network devices in the network shown in the foregoing embodiments.

In this embodiment, the storage medium is configured to store program code for performing the following steps: obtaining, by using a target recording device in a control system, first image information of a target object currently moving in a real scene; obtaining a first distance corresponding to the first image information, the first distance being a distance between the target recording device and the target object; and adjusting a target parameter of the control system according to the first distance, the target parameter being used for controlling the control system to output media information to a VR device, the VR device being connected to the control system, the media information being corresponding to movement information of the target object moving in the real scene, and the movement information including the first distance.

In some embodiments, the storage medium is further configured to store program code used for performing the following steps: obtaining a first image parallax between first sub-image information and second sub-image information in the first image information, where the first sub-image information is obtained by recording the target object by a first video camera, the second sub-image information is obtained by recording the target object by a second video camera, the first video camera and the second video camera are deployed in the target recording device, and the first image parallax is used for representing a difference between a first image of the target object indicated by the first sub-image information and a second image of the target object indicated by the second sub-image information; and obtaining the first distance corresponding to the first image parallax in a target correspondence table.

In some embodiments, the storage medium is further configured to store program code used for performing the following steps: obtaining a first midpoint horizontal coordinate in the first sub-image information, where the first midpoint horizontal coordinate is a horizontal coordinate of a central point of the first image in a target coordinate system; obtaining a second midpoint horizontal coordinate in the second sub-image information, where the second midpoint horizontal coordinate is a horizontal coordinate of a central point of the second image in the target coordinate system; and determining a difference between the first midpoint horizontal coordinate and the second midpoint horizontal coordinate as the first image parallax.

In some embodiments, the storage medium is further configured to store program code used for performing the following steps: looking up the target correspondence table for a target image parallax with a minimum difference from the first image parallax; and determining a distance corresponding to the target image parallax in the target correspondence table as the first distance.

In some embodiments, the storage medium is further configured to store program code used for performing the following steps: before the obtaining the first distance corresponding to the first image parallax in a target correspondence table, obtaining second image information of the target object by using the target recording device, where the distance between the target object and the target recording device is a first target distance; obtaining a second image parallax between third sub-image information and fourth sub-image information in the second image information, where the third sub-image information is obtained by recording the target object by the first video camera, the fourth sub-image information is obtained by recording the target object by the second video camera, and the second image parallax is used for representing a difference between a third image of the target object indicated by the third sub-image information and a fourth image of the target object indicated by the fourth sub-image information; establishing a correspondence between the first target distance and the second image parallax in the target correspondence table; obtaining third image information of the target object by using the target recording device, where the distance between the target object and the target recording device is a second target distance, and the second target distance is different from the first target distance; obtaining a third image parallax between fifth sub-image information and sixth sub-image information in the third image information, where the fifth sub-image information is obtained by recording the target object by the first video camera, the sixth sub-image information is obtained by recording the target object by the second video camera, and the third image parallax is used for representing a difference between a fifth image of the target object indicated by the fifth sub-image information and a sixth image of the target object indicated by the sixth sub-image information; and establishing a correspondence between the second target distance and the third image parallax in the target correspondence table.

In some embodiments, the storage medium is further configured to store program code used for performing the following steps: obtaining a third midpoint horizontal coordinate in the third sub-image information, where the third midpoint horizontal coordinate is a horizontal coordinate of a central point of the third image in a target coordinate system; obtaining a fourth midpoint horizontal coordinate in the fourth sub-image information, where the fourth midpoint horizontal coordinate is a horizontal coordinate of a central point of the fourth image in the target coordinate system; and determining a difference between the third midpoint horizontal coordinate and the fourth midpoint horizontal coordinate as the second image parallax; obtaining a fifth midpoint horizontal coordinate in the fifth sub-image information, where the fifth midpoint horizontal coordinate is a horizontal coordinate of a central point of the fifth image in the target coordinate system; obtaining a sixth midpoint horizontal coordinate in the sixth sub-image information, where the sixth midpoint horizontal coordinate is a horizontal coordinate of a central point of the sixth image in the target coordinate system; and determining a difference between the fifth midpoint horizontal coordinate and the sixth midpoint horizontal coordinate as the third image parallax.

In some embodiments, the storage medium is further configured to store program code used for performing the following steps: increasing a sound parameter of the control system if a status change of the first distance indicates that the first distance is reduced, where the target parameter includes the sound parameter, the media information includes sound information, and the sound parameter is used for controlling the control system to output the sound information to the VR device; and decreasing the sound parameter of the control system if the status change of the first distance indicates that the first distance increased.

In some embodiments, the storage medium is further configured to store program code used for performing the following steps: adjusting a light parameter of the control system to a first value if a status change of the first distance indicates that the first distance is reduced, so that light of the control system is focused within a target region of the target recording device, where the target parameter includes the light parameter, the media information includes light information, and the light parameter is used for controlling the control system to output the light information to the VR device; and adjusting the light parameter of the control system to a second value if the status change of the first distance indicates that the first distance increased, so that the light of the control system is focused beyond the target region of the target recording device.

In some embodiments, the storage medium is further configured to store program code used for performing the following steps: obtaining the first distance corresponding to the first image information by using a central computing device in the control system, where the central computing device is connected to the target recording device; receiving, by using a controller in the control system, the first distance transmitted by the computing center device, and adjusting the target parameter of the control system according to the first distance.

In some embodiments, reference may be made to the examples described in the foregoing embodiments for specific examples in this embodiment. Details are not described in this embodiment.

In this embodiment, the storage medium may include but is not limited to any medium that can store program code, such as a USB flash drive, a ROM, a RAM, a removable hard disk, a magnetic disk, or an optical disc.

The method and the apparatus for operating a control system, the storage medium, and the electronic apparatus according to the embodiments of the present disclosure are described above by using examples with reference to the accompanying drawings. However, a person skilled in the art should understand that, various improvements may further be made for the method and the apparatus for operating a control system, the storage medium, and the electronic apparatus provided in the embodiments of the present disclosure without departing from content of the present disclosure. Therefore, the protection scope of the embodiments of the present disclosure should be subject to content of the appended claims.

The sequence numbers of the foregoing embodiments of the present disclosure are merely for description purpose but do not indicate the preference of the embodiments.

If the integrated units in the foregoing embodiments are implemented in a form of software functional units and are sold or used as an independent product, the units may be stored in a computer readable storage medium. Based on such an understanding, the technical solutions of the present disclosure essentially, or the part contributing to the related technology, or all or some of the technical solutions may be represented in a form of a software product. The computer software product is stored in a storage medium and includes several instructions for instructing one or more computer devices (which may be a personal computer, a server, or a network device) to perform all or some of the steps of the methods in the embodiments of the present disclosure.

In the foregoing embodiments of the present disclosure, the descriptions of the embodiments have respective focuses. For a part not described in detail in an embodiment, refer to a related description of another embodiment.

In the several embodiments provided in the present application, it should be understood that the disclosed client may be implemented in other manners. The described apparatus embodiments are merely schematic. For example, division of the units is merely division of logic functions, and there may be another division manner during actual implementation. For example, multiple units or components may be combined or may be integrated into another system, or some features may be omitted or not be executed. In addition, the displayed or discussed mutual coupling, or direct coupling, or communication connections may be implemented through some interfaces. Indirect coupling or communication connections between the units or modules may be implemented in electronic or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated units may be implemented in a form of hardware or may be implemented in a form of a software functional unit.

The foregoing descriptions are merely exemplary implementations of the present disclosure. A person of ordinary skill in the art may make several improvements or polishing without departing from the principle of the present disclosure, and the improvements or polishing shall also fall within the protection scope of the present disclosure.

INDUSTRIAL PRACTICABILITY

In the embodiments of the present disclosure, first image information of a target object currently moving in a real scene is obtained by using a target recording device in a control system; a first distance corresponding to the first image information is obtained, the first distance being a distance between the target recording device and the target object; and a target parameter of the control system is adjusted according to the first distance, the target parameter being used to control media information sent to a VR device, the VR device being connected to the control system, the media information being corresponding to movement information of the target object moving in the real scene, and the movement information including the first distance. According to the correspondence between the image information and the distance, the first distance between the target recording device and the target object may be obtained at low cost by using the first image information of the target object, and the target parameter of the control system may further be adjusted according to the first distance, to control, by using the target parameter, the control system to output the media information corresponding to the movement information of the target object to the VR device, thereby avoiding manually adjusting the target parameter of the control system, achieving the objective of controlling, by using the target parameter of the control system, the control system to output the media information to the VR device, achieving the technical effect of reducing control costs of the control system, and further resolving the technical problem of large control costs of the control system in the related technology.

What is claimed is:

1. A method for operating a control system, comprising:
obtaining, by using a target recording device in a control system, first image information of a target object moving in a real scene;
obtaining a first distance corresponding to the first image information, the first distance being a distance between the target recording device and the target object; and
adjusting a target parameter of the control system according to the first distance, the target parameter being used for outputting media information to a virtual reality (VR) device, the VR device being connected to the control system, the media information being corresponding to movement information of the target object moving in the real scene, and the movement information comprising the first distance,
wherein the media information comprises light information, the target parameter comprises a light parameter used to control the light information being sent to the VR device, and adjusting the target parameter of the control system according to the first distance comprises:
adjusting the light parameter to a first value if a status change of the first distance indicates that the first distance is reduced, light of the control system being focused within a target region of the target recording device; and
adjusting the light parameter to a second value if the status change of the first distance indicates that the first distance is increased, the light of the control system being focused beyond the target region of the target recording device.

2. The method according to claim 1, the obtaining a first distance corresponding to the first image information comprising:
obtaining a first image parallax between first sub-image information and second sub-image information in the first image information, wherein the first sub-image information is obtained by recording the target object by a first video camera, the second sub-image information is obtained by recording the target object by a second video camera, the first video camera and the second video camera are in the target recording device, and the first image parallax representing a difference between a first image of the target object indicated by the first sub-image information and a second image of the target object indicated by the second sub-image information; and
obtaining the first distance corresponding to the first image parallax in a target correspondence table.

3. The method according to claim 2, the obtaining a first image parallax between first sub-image information and second sub-image information in the first image information comprising:
obtaining a first midpoint horizontal coordinate in the first sub-image information, the first midpoint horizontal coordinate being a horizontal coordinate of a central point of the first image in a target coordinate system;
obtaining a second midpoint horizontal coordinate in the second sub-image information, the second midpoint horizontal coordinate being a horizontal coordinate of a central point of the second image in the target coordinate system; and
determining a difference between the first midpoint horizontal coordinate and the second midpoint horizontal coordinate as the first image parallax.

4. The method according to claim 2, the obtaining the first distance corresponding to the first image parallax in a target correspondence table comprising:
looking up the target correspondence table for a target image parallax with a minimum difference from the first image parallax; and determining a distance corresponding to the target image parallax in the target correspondence table as the first distance.

5. The method according to claim 2, wherein before the obtaining the first distance corresponding to the first image parallax in a target correspondence table, the method further comprises:
obtaining second image information of the target object by using the target recording device, the distance between the target object and the target recording device being a first target distance;
obtaining a second image parallax between third sub-image information and fourth sub-image information in the second image information, the third sub-image information being obtained by recording the target object by the first video camera, the fourth sub-image information being obtained by recording the target object by the second video camera, and the second image parallax representing a difference between a third image of the target object indicated by the third sub-image information and a fourth image of the target object indicated by the fourth sub-image information;
establishing a correspondence between the first target distance and the second image parallax in the target correspondence table;
obtaining third image information of the target object by using the target recording device, the distance between the target object and the target recording device being a second target distance, and the second target distance being different from the first target distance;
obtaining a third image parallax between fifth sub-image information and sixth sub-image information in the third image information, wherein the fifth sub-image information is obtained by recording the target object by the first video camera, the sixth sub-image information is obtained by recording the target object by the second video camera, and the third image parallax representing a difference between a fifth image of the target object indicated by the fifth sub-image information and a sixth image of the target object indicated by the sixth sub-image information; and
establishing a correspondence between the second target distance and the third image parallax in the target correspondence table.

6. The method according to claim 5, the obtaining the second image parallax between the third sub-image information and the fourth sub-image information further comprising:
obtaining a third midpoint horizontal coordinate in the third sub-image information, wherein the third midpoint horizontal coordinate is a horizontal coordinate of a central point of the third image in a target coordinate system;
obtaining a fourth midpoint horizontal coordinate in the fourth sub-image information, wherein the fourth midpoint horizontal coordinate is a horizontal coordinate of a central point of the fourth image in the target coordinate system; and determining a difference between the third midpoint horizontal coordinate and the fourth midpoint horizontal coordinate as the second image parallax; and
the obtaining the third image parallax between the fifth sub-image information and the sixth sub-image information comprising:
obtaining a fifth midpoint horizontal coordinate in the fifth sub-image information, wherein the fifth midpoint horizontal coordinate is a horizontal coordinate of a central point of the fifth image in the target coordinate system;
obtaining a sixth midpoint horizontal coordinate in the sixth sub-image information, wherein the sixth midpoint horizontal coordinate is a horizontal coordinate of a central point of the sixth image in the target coordinate system; and
determining a difference between the fifth midpoint horizontal coordinate and the sixth midpoint horizontal coordinate as the third image parallax.

7. The method according to claim 3, the obtaining a first midpoint horizontal coordinate in the first sub-image information comprising one of the following:
determining an average value between a horizontal coordinate of a central point of a left-eye image in the target coordinate system and a horizontal coordinate of a central point of a right-eye image in the target coordinate system as the first midpoint horizontal coordinate if the first image information is image information of a face;
determining a horizontal coordinate of a central point of a nose sub-image in the target coordinate system as the first midpoint horizontal coordinate if the first image information is the image information of the face;
determining an average value between a horizontal coordinate of a central point of a left-hand image in the target coordinate system and a horizontal coordinate of a central point of a right-hand image in the target coordinate system as the first midpoint horizontal coordinate if the first image information is image information of a portrait; and
identifying an average value between a horizontal coordinate of a central point of a left-arm image in the target coordinate system and a horizontal coordinate of a central point of a right-arm image in the target coordinate system as the first midpoint horizontal coordinate if the first image information is the image information of the portrait.

8. The method according to claim 1, the adjusting a target parameter of the control system according to the first distance comprising:
increasing a sound parameter of the control system if a status change of the first distance indicates that the first distance is reduced, wherein the target parameter comprises the sound parameter, the media information comprises sound information, and the sound parameter is used to control the sound information being sent to the VR device; and
decreasing the sound parameter of the control system if the status change of the first distance indicates that the first distance is increased.

9. The method according to claim 1, the obtaining the first distance corresponding to the first image information comprising:
obtaining the first distance corresponding to the first image information by using a central computing device in the control system connected to the target recording device; and
the adjusting a target parameter of the control system according to the first distance comprising:
receiving, by using a controller in the control system, the first distance transmitted by the computing center device, and adjusting the target parameter of the control system according to the first distance.

10. An apparatus for operating a control system, comprising one or more processors and one or more memories storing program instructions, the processor being configured, when executing the program instructions, to:
 obtain, by using a target recording device in a control system, first image information of a target object moving in a real scene;
 obtain a first distance corresponding to the first image information, the first distance being a distance between the target recording device and the target object; and
 adjust a target parameter of the control system according to the first distance, the target parameter being used to control media information being sent to a virtual reality (VR) device, the VR device being connected to the control system, and the media information being corresponding to movement information of the target object moving in the real scene, and the movement information comprising the first distance,
 wherein the media information comprises light information, the target parameter comprises a light parameter used to control the light information being sent to the VR device, and adjusting the target parameter of the control system according to the first distance comprises:
  adjusting the light parameter to a first value if a status change of the first distance indicates that the first distance is reduced, light of the control system being focused within a target region of the target recording device; and
  adjusting the light parameter to a second value if the status change of the first distance indicates that the first distance is increased, the light of the control system being focused beyond the target region of the target recording device.

11. The apparatus according to claim 10, wherein the processor is further configured to:
 obtain a first image parallax between first sub-image information and second sub-image information in the first image information, wherein the first sub-image information is obtained by recording the target object by a first video camera, the second sub-image information is obtained by recording the target object by a second video camera, the first video camera and the second video camera are in the target recording device, and the first image parallax representing a difference between a first image of the target object indicated by the first sub-image information and a second image of the target object indicated by the second sub-image information; and
 obtain the first distance corresponding to the first image parallax in a target correspondence table.

12. The apparatus according to claim 11, wherein the processor is further configured to:
 obtain a first midpoint horizontal coordinate in the first sub-image information, wherein the first midpoint horizontal coordinate is a horizontal coordinate of a central point of the first image in a target coordinate system;
 obtain a second midpoint horizontal coordinate in the second sub-image information, wherein the second midpoint horizontal coordinate is a horizontal coordinate of a central point of the second image in the target coordinate system; and
 determine a difference between the first midpoint horizontal coordinate and the second midpoint horizontal coordinate as the first image parallax.

13. A non-transitory computer readable storage medium, the storage medium storing a computer program, and when executed by one or more processors, the computer program causing the one or more processors to perform:
 obtaining, by using a target recording device in a control system, first image information of a target object moving in a real scene;
 obtaining a first distance corresponding to the first image information, the first distance being a distance between the target recording device and the target object; and
 adjusting a target parameter of the control system according to the first distance, the target parameter being used for outputting media information to a virtual reality (VR) device, the VR device being connected to the control system, the media information being corresponding to movement information of the target object moving in the real scene, and the movement information comprising the first distance,
 wherein the media information comprises light information, the target parameter comprises a light parameter used to control the light information being sent to the VR device, and adjusting the target parameter of the control system according to the first distance comprises:
  adjusting the light parameter to a first value if a status change of the first distance indicates that the first distance is reduced, light of the control system being focused within a target region of the target recording device; and
  adjusting the light parameter to a second value if the status change of the first distance indicates that the first distance is increased, the light of the control system being focused beyond the target region of the target recording device.

14. The non-transitory computer readable storage medium according to claim 13, the obtaining a first distance corresponding to the first image information comprising:
 obtaining a first image parallax between first sub-image information and second sub-image information in the first image information, wherein the first sub-image information is obtained by recording the target object by a first video camera, the second sub-image information is obtained by recording the target object by a second video camera, the first video camera and the second video camera are in the target recording device, and the first image parallax representing a difference between a first image of the target object indicated by the first sub-image information and a second image of the target object indicated by the second sub-image information; and
 obtaining the first distance corresponding to the first image parallax in a target correspondence table.

15. The non-transitory computer readable storage medium according to claim 14, the obtaining a first image parallax between first sub-image information and second sub-image information in the first image information comprising:
 obtaining a first midpoint horizontal coordinate in the first sub-image information, the first midpoint horizontal coordinate being a horizontal coordinate of a central point of the first image in a target coordinate system;
 obtaining a second midpoint horizontal coordinate in the second sub-image information, the second midpoint horizontal coordinate being a horizontal coordinate of a central point of the second image in the target coordinate system; and
 determining a difference between the first midpoint horizontal coordinate and the second midpoint horizontal coordinate as the first image parallax.

16. The non-transitory computer readable storage medium according to claim 14, the obtaining the first distance corresponding to the first image parallax in a target correspondence table comprising:
- looking up the target correspondence table for a target image parallax with a minimum difference from the first image parallax; and
- determining a distance corresponding to the target image parallax in the target correspondence table as the first distance.

17. The non-transitory computer readable storage medium according to claim 14, before the obtaining the first distance corresponding to the first image parallax in a target correspondence table, the computer program further causing the one or more processors to perform:
- obtaining second image information of the target object by using the target recording device, the distance between the target object and the target recording device being a first target distance;
- obtaining a second image parallax between third sub-image information and fourth sub-image information in the second image information, the third sub-image information being obtained by recording the target object by the first video camera, the fourth sub-image information being obtained by recording the target object by the second video camera, and the second image parallax representing a difference between a third image of the target object indicated by the third sub-image information and a fourth image of the target object indicated by the fourth sub-image information;
- establishing a correspondence between the first target distance and the second image parallax in the target correspondence table;
- obtaining third image information of the target object by using the target recording device, the distance between the target object and the target recording device being a second target distance, and the second target distance being different from the first target distance;
- obtaining a third image parallax between fifth sub-image information and sixth sub-image information in the third image information, wherein the fifth sub-image information is obtained by recording the target object by the first video camera, the sixth sub-image information is obtained by recording the target object by the second video camera, and the third image parallax representing a difference between a fifth image of the target object indicated by the fifth sub-image information and a sixth image of the target object indicated by the sixth sub-image information; and
- establishing a correspondence between the second target distance and the third image parallax in the target correspondence table.

18. The non-transitory computer readable storage medium according to claim 17, the obtaining the second image parallax between the third sub-image information and the fourth sub-image information further comprising:
- obtaining a third midpoint horizontal coordinate in the third sub-image information, wherein the third midpoint horizontal coordinate is a horizontal coordinate of a central point of the third image in a target coordinate system;
- obtaining a fourth midpoint horizontal coordinate in the fourth sub-image information, wherein the fourth midpoint horizontal coordinate is a horizontal coordinate of a central point of the fourth image in the target coordinate system; and determining a difference between the third midpoint horizontal coordinate and the fourth midpoint horizontal coordinate as the second image parallax; and
- the obtaining the third image parallax between the fifth sub-image information and the sixth sub-image information comprising:
- obtaining a fifth midpoint horizontal coordinate in the fifth sub-image information, wherein the fifth midpoint horizontal coordinate is a horizontal coordinate of a central point of the fifth image in the target coordinate system;
- obtaining a sixth midpoint horizontal coordinate in the sixth sub-image information, wherein the sixth midpoint horizontal coordinate is a horizontal coordinate of a central point of the sixth image in the target coordinate system; and
- identifying a difference between the fifth midpoint horizontal coordinate and the sixth midpoint horizontal coordinate as the third image parallax.

19. The non-transitory computer readable storage medium according to claim 15, the obtaining a first midpoint horizontal coordinate in the first sub-image information comprising one of the following:
- determining an average value between a horizontal coordinate of a central point of a left-eye image in the target coordinate system and a horizontal coordinate of a central point of a right-eye image in the target coordinate system as the first midpoint horizontal coordinate if the first image information is image information of a face;
- determining a horizontal coordinate of a central point of a nose sub-image in the target coordinate system as the first midpoint horizontal coordinate if the first image information is the image information of the face;
- determining an average value between a horizontal coordinate of a central point of a left-hand image in the target coordinate system and a horizontal coordinate of a central point of a right-hand image in the target coordinate system as the first midpoint horizontal coordinate if the first image information is image information of a portrait; and
- identifying an average value between a horizontal coordinate of a central point of a left-arm image in the target coordinate system and a horizontal coordinate of a central point of a right-arm image in the target coordinate system as the first midpoint horizontal coordinate if the first image information is the image information of the portrait.

* * * * *